(12) United States Patent
Kwag

(10) Patent No.: US 11,652,256 B2
(45) Date of Patent: May 16, 2023

(54) BATTERY PACK

(71) Applicant: SAMSUNG SDI CO., LTD., Yongin-si (KR)

(72) Inventor: Nohyun Kwag, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 119 days.

(21) Appl. No.: 17/106,303

(22) Filed: Nov. 30, 2020

(65) Prior Publication Data

US 2021/0167347 A1    Jun. 3, 2021

(30) Foreign Application Priority Data

Nov. 29, 2019  (KR) .................. 10-2019-0157466

(51) Int. Cl.
*H01M 50/20*   (2021.01)
*H01M 50/502*  (2021.01)

(52) U.S. Cl.
CPC ......... *H01M 50/20* (2021.01); *H01M 50/502* (2021.01)

(58) Field of Classification Search
CPC .. H01M 50/20; H01M 50/502; H01M 10/425; H01M 50/204; H01M 50/519; H01M 10/482; H01M 2220/20; Y02E 60/10
See application file for complete search history.

(56) References Cited

U.S. PATENT DOCUMENTS

| | | | |
|---|---|---|---|
| 7,683,575 B2 | 3/2010 | Berdichevsky et al. | |
| 8,241,772 B2 | 8/2012 | Hermann et al. | |
| 8,322,393 B2 | 12/2012 | Hermann et al. | |
| 9,627,151 B2 | 4/2017 | Sengoku et al. | |
| 10,158,102 B2 | 12/2018 | Wu et al. | |
| 10,305,074 B2 | 5/2019 | Yoon | |
| 10,396,406 B2 | 8/2019 | Lee | |
| 10,811,734 B2 | 10/2020 | Gong et al. | |
| 10,978,689 B2 | 4/2021 | Kwag et al. | |

(Continued)

FOREIGN PATENT DOCUMENTS

| | | |
|---|---|---|
| CN | 203481285 U | 3/2014 |
| CN | 206976514 U | 2/2018 |

(Continued)

OTHER PUBLICATIONS

Extended European Search Report dated Jul. 21, 2021 for corresponding EP Patent Application No. 20210430.3 (U.S. Appl. No. 17/106,256).

(Continued)

*Primary Examiner* — Michael L Dignan
(74) *Attorney, Agent, or Firm* — Lee IP Law, P.C.

(57) ABSTRACT

A battery pack including a plurality of battery cells; a plurality of bus bars, each bus bar electrically connecting two different battery cells among the plurality of battery cells, and including coupling pieces at opposite ends thereof that are coupled to the two different battery cells, and a protruding connecting piece at a center of the bus bar that connects the coupling pieces at the opposite ends; and a circuit board on the plurality of bus bars and electrically connected to at least a portion of the plurality of battery cells, the circuit board having escape holes that expose the protruding connection piece of each bus bar.

18 Claims, 19 Drawing Sheets

(56) References Cited

U.S. PATENT DOCUMENTS

| | | | |
|---|---|---|---|
| 11,233,285 B2 | 1/2022 | Kang | |
| 11,462,799 B2 | 10/2022 | Ahn et al. | |
| 2005/0110458 A1 | 5/2005 | Seman, Jr. et al. | |
| 2009/0148754 A1 | 6/2009 | Marchio et al. | |
| 2010/0047676 A1 | 2/2010 | Park et al. | |
| 2010/0047682 A1 | 2/2010 | Houchin-Miller et al. | |
| 2010/0062329 A1 | 3/2010 | Muis | |
| 2010/0124693 A1* | 5/2010 | Kosugi | H01M 50/505 429/92 |
| 2011/0027622 A1 | 2/2011 | Hong | |
| 2011/0223452 A1* | 9/2011 | Yoshida | H01M 10/643 429/83 |
| 2012/0058368 A1 | 3/2012 | Yamamoto et al. | |
| 2012/0135296 A1 | 5/2012 | Itoi et al. | |
| 2012/0189885 A1 | 7/2012 | Kishii et al. | |
| 2012/0301747 A1 | 11/2012 | Han et al. | |
| 2014/0050967 A1 | 2/2014 | Fuhr et al. | |
| 2014/0227570 A1* | 8/2014 | Hoshi | H01M 10/486 429/90 |
| 2014/0255748 A1 | 9/2014 | Jan et al. | |
| 2015/0118530 A1 | 4/2015 | Lee | |
| 2015/0295280 A1 | 10/2015 | Cho et al. | |
| 2015/0349389 A1* | 12/2015 | Kobune | H01M 10/482 429/90 |
| 2016/0035497 A1* | 2/2016 | Sengoku | H01G 2/04 429/90 |
| 2016/0141585 A1 | 5/2016 | Berg et al. | |
| 2018/0269536 A1* | 9/2018 | Wei | H01M 50/20 |
| 2018/0316073 A1 | 11/2018 | Ruehle et al. | |
| 2018/0358671 A1 | 12/2018 | Halsey et al. | |
| 2018/0366697 A1 | 12/2018 | Effering et al. | |
| 2019/0067655 A1 | 2/2019 | Nakamura et al. | |
| 2019/0140235 A1 | 5/2019 | Lindstrom et al. | |
| 2020/0076022 A1 | 3/2020 | Kawakami et al. | |
| 2020/0112007 A1 | 4/2020 | Kwag | |
| 2020/0147673 A1 | 5/2020 | Rodenburg et al. | |
| 2020/0203788 A1 | 6/2020 | Kang | |
| 2020/0220147 A1 | 7/2020 | Haino et al. | |
| 2020/0251702 A1 | 8/2020 | Seol et al. | |
| 2020/0365866 A1* | 11/2020 | Lin | H01M 50/507 |
| 2021/0083255 A1* | 3/2021 | Demont | H01M 50/249 |
| 2021/0359358 A1 | 11/2021 | George et al. | |

FOREIGN PATENT DOCUMENTS

| | | | |
|---|---|---|---|
| CN | 108598311 A | 9/2018 | |
| DE | 102013207357 * | 10/2014 | H01M 2/26 |
| DE | 10 2016 206 463 A1 | 10/2017 | |
| DE | 102016206463 A1 | 10/2017 | |
| EP | 2 187 465 A1 | 5/2010 | |
| EP | 2 866 295 A | 4/2015 | |
| EP | 3 637 498 A | 4/2020 | |
| JP | 2006-156171 A | 6/2003 | |
| JP | 4193328 B2 | 12/2008 | |
| JP | 2009-187734 A | 8/2009 | |
| JP | 5294575 B2 | 9/2013 | |
| JP | 2014-179289 A | 9/2014 | |
| JP | 2014-197452 A | 10/2014 | |
| JP | 2015-138748 A | 7/2015 | |
| JP | 5873210 B2 | 3/2016 | |
| JP | 2016-534518 A | 11/2016 | |
| JP | 6148406 B2 | 6/2017 | |
| JP | 2018-005984 A | 1/2018 | |
| JP | 2018-116775 A | 7/2018 | |
| KR | 10-2015-0048501 A | 5/2015 | |
| KR | 10-2016-0020645 A | 2/2016 | |
| KR | 10-2016-0138994 A | 12/2016 | |
| KR | 10-2017-0089247 A | 8/2017 | |
| KR | 10-2018-0068993 A | 6/2018 | |
| KR | 10-2018-0088197 A | 8/2018 | |
| KR | 10-2018-0129115 A | 12/2018 | |
| KR | 10-2019-0034019 A | 1/2019 | |
| KR | 10-2019-0022485 A | 3/2019 | |
| KR | 10-2019-0034020 A | 4/2019 | |
| KR | 10-2019-0086853 A | 7/2019 | |
| KR | 10-2019-0087744 A | 7/2019 | |
| KR | 10-2017-0021519 A | 2/2022 | |
| WO | WO 2007/134198 A1 | 11/2007 | |
| WO | WO 2009/011748 A1 | 1/2009 | |
| WO | WO 2014/125642 * | 8/2014 | H01M 2/10 |
| WO | WO 2015/066078 A1 | 5/2015 | |
| WO | WO 2017/047258 A1 | 3/2017 | |
| WO | WO 2018/221004 A1 | 12/2018 | |
| WO | WO 2019/021980 A1 | 1/2019 | |
| WO | WO 2019/143060 A1 | 7/2019 | |
| WO | WO 2019/182117 A1 | 9/2019 | |
| WO | WO 2020/058694 A1 | 3/2020 | |

OTHER PUBLICATIONS

European Search Report dated Mar. 17, 2021.
Extended European Search Report dated Jul. 23, 2021 for corresponding EP Patent Application No. 20210460.0 (U.S. Appl. No. 17/106,297).
USPTO Office action dated May 10, 2022 for U.S. Appl. No. 17/106,282.
USPTO Office action dated Jul. 13, 2022 for U.S. Appl. No. 17/106,297.
USPTO Office action dated Jul. 25, 2022 for U.S. Appl. No. 17/106,290.
Extended European Search Report dated Mar. 22, 2021 for corresponding EP Patent Application No. 20210426.1 (U.S. Appl. No. 17/106,247).
Extended European Search Report dated Mar. 22, 2021 for corresponding EP Patent Application No. 20210423.8 (U.S. Appl. No. 17/106,290).
Partial European Search Report dated Mar. 26, 2021 for corresponding EP Patent Application No. 20210460.0 (U.S. Appl. No. 17/106,297).
Partial European Search Report dated Mar. 31, 2021 for corresponding EP Patent Application No. 20210430.3 (U.S. Appl. No. 17/106,256).
Extended European Search Report dated Apr. 22, 2021 for corresponding EP Patent Application No. 20210464.2 (U.S. Appl. No. 17/106,282).
Korean Office action dated Jul. 18, 2022 for corresponding KR Patent Application No. 10-2019-0157466.
USPTO Final Rejection dated Aug. 26, 2022 for U.S. Appl. No. 17/106,282.
Korean Office action dated Aug. 23, 2022 for corresponding KR Patent Application No. 10-2019-0157680.
USPTO Final Rejection dated Nov. 7, 2022 for related U.S. Appl. No. 17/106,290.
USPTO Rejection dated Nov. 10, 2022 for related U.S. Appl. No. 17/106,247.
Korean Office action dated Oct. 21, 2022 for corresponding KR Patent Application No. 10-2019-0157508.
Korean Office action dated Nov. 8, 2022 in corresponding KR Patent Application No. I0-2019-0157693.
USPTO Final Rejection dated Feb. 10, 2023 for U.S. Appl. No. 17/106,297.

* cited by examiner

BATTERY PACK

CROSS-REFERENCE TO RELATED APPLICATION

Korean Patent Application No. 10-2019-0157466, filed on Nov. 29, 2019, in the Korean Intellectual Property Office, and entitled: "Battery Pack," is incorporated by reference herein in its entirety.

BACKGROUND

1. Field

Embodiments relate to a battery pack.

2. Description of the Related Art

Secondary batteries are rechargeable unlike non-rechargeable primary batteries. Secondary batteries are used as energy sources of devices such as mobile devices, electric vehicles, hybrid electric vehicles, electric bicycles, and uninterruptible power supplies, and according to the types of external devices using secondary batteries, secondary batteries may be used as single battery cells or battery packs in which a plurality of battery cells are connected into a unit.

Small mobile devices such as mobile phones may operate for a predetermined time by using an output and a capacity of a single battery, in the case of electric automobiles or hybrid automobiles which may have large power consumption, a long driving time, and high-power driving, battery packs may be used to meet the power and capacity requirements, and an output voltage or an output current of a battery pack may increase as the number of battery cells embedded therein increases.

SUMMARY

The embodiments may be realized by providing a battery pack including a plurality of battery cells; a plurality of bus bars, each bus bar electrically connecting two different battery cells among the plurality of battery cells, and including coupling pieces at opposite ends thereof that are coupled to the two different battery cells, and a protruding connecting piece at a center of the bus bar that connects the coupling pieces at opposite ends; and a circuit board on the plurality of bus bars and electrically connected to at least a portion of the plurality of battery cells, the circuit board having escape holes that expose the protruding connection piece of each bus bar.

Each escape hole may completely expose an entirety of a corresponding protruding connection piece.

The protruding connection pieces may not overlap a solid portion of the circuit board that surrounds the escape holes.

Each escape hole may completely accommodate an entirety of a corresponding protruding connection piece.

The circuit board may have a lower side facing the plurality of battery cells and an upper side that is opposite to the plurality of battery cells, along a height direction of the plurality of battery cells, and a plane of each protruding connection piece may be between a plane of the upper side of the circuit board and a plane of the lower side of the circuit board.

The battery pack may further include a cell holder, the cell holder having a first side in which the battery cells are accommodated, and a second side including hollow protrusions connected to cooling flow paths between adjacent battery cells of the plurality of battery cells.

The bus bars and the circuit board may be on the second side of the cell holder.

Each bus bar may extend between a corresponding pair of the hollow protrusions that face each other.

The pair of the hollow protrusions may face each other in a direction intersecting a lengthwise extending direction of the bus bar therebetween.

The protruding connection piece of each bus bar may be between the corresponding pair of the hollow protrusions.

The cell holder may further include pairs of locking steps, into which the protruding connection piece of each bus bar is inserted, at each of the pairs of hollow protrusions, the pairs of locking steps each protruding from wall bodies of the corresponding pair of hollow protrusions toward the protruding connection piece therebetween.

The cell holder may further include mold holes from which the pairs of hollow protrusions protrude, at positions corresponding to the pairs of locking steps, to pass through the cell holder.

Each bus bar may further include position alignment holes for position alignment with the cell holder, the position alignment holes being in the protruding connection piece of each bus bar, and the cell holder may further include position alignment pins that are insertable into the position alignment holes of corresponding bus bars, the position alignment pins being between the pairs of hollow protrusions.

Pairs of the position alignment pins may be arranged along a lengthwise direction of a corresponding one of the plurality of bus bars.

The circuit board may further include a bus opening region continuous with the escape holes in a single hole shape, the bus opening region exposing the hollow protrusions of the cell holder and the protruding connection pieces of the plurality of bus bars.

The bus opening region may expose pairs of the hollow protrusions together with the protruding connection pieces therebetween.

The battery pack may further include connection members on the circuit board, passing through the circuit board, and connected to the battery cells, wherein the circuit board further includes connection opening regions, the connection members pass through the connection opening regions of the circuit board, and the connection opening regions expose pairs of the hollow protrusions facing each other with corresponding connection members therebetween.

Respective ends of the connection members may be ultrasonically welded to the circuit board and the battery cell.

The bus opening region and the connection opening region may be continuous with each other to form a second opening region in a single hole shape.

The second opening region may expose a first hollow protrusion of the hollow protrusions that is between a first bus bar of the plurality of bus bars and a first connection member of the connection members, a second hollow protrusion of the hollow protrusions that faces the first hollow protrusion with the first bus bar therebetween, and a third hollow protrusion of the hollow protrusions that faces the first hollow protrusion with the first connection member of the connection members therebetween.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
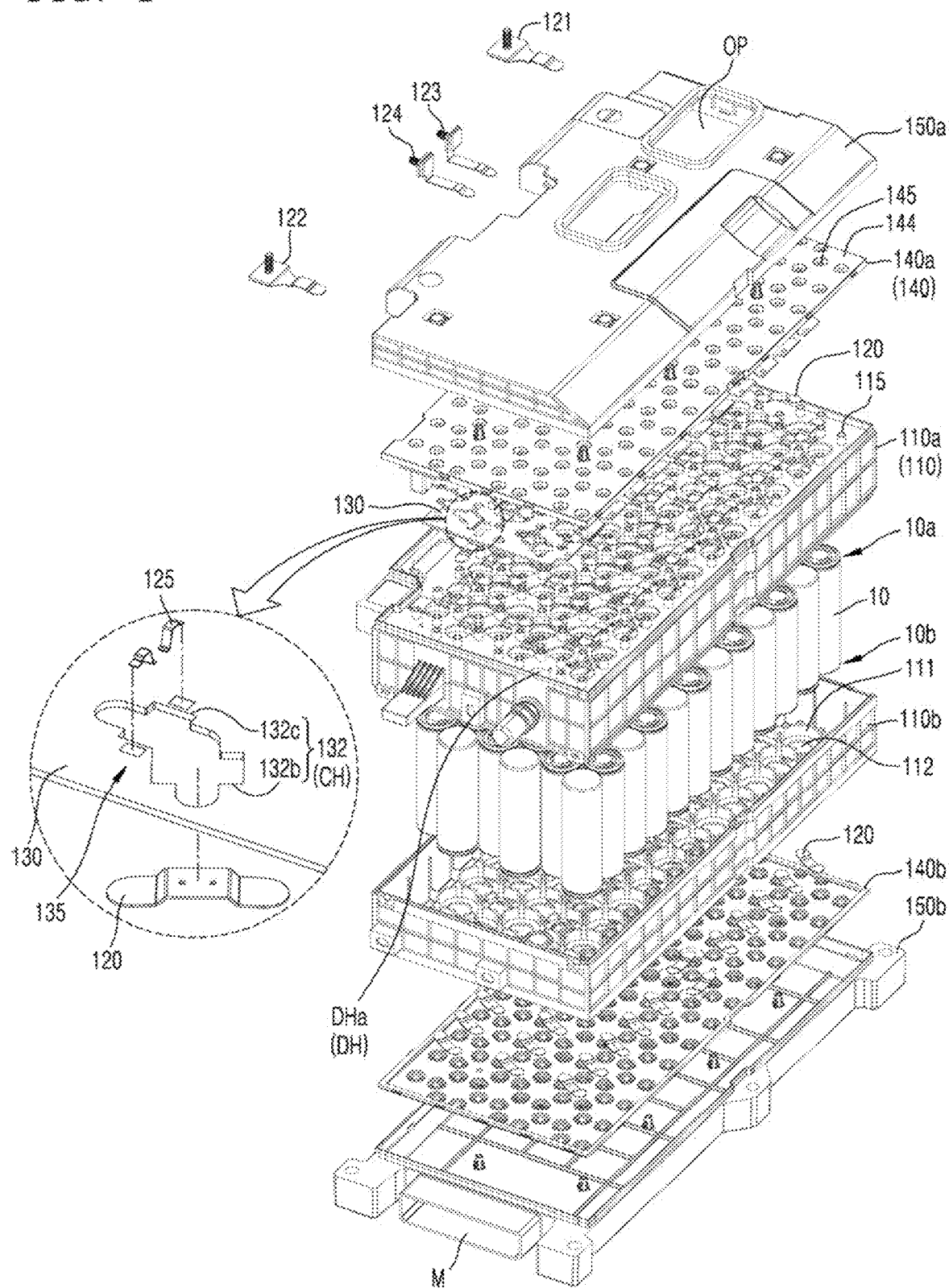
FIG. 1 is an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Expressions such as "at least one of," when preceding a list of elements, modify the entire list of elements and do not modify the individual elements of the list.

Figure 2:
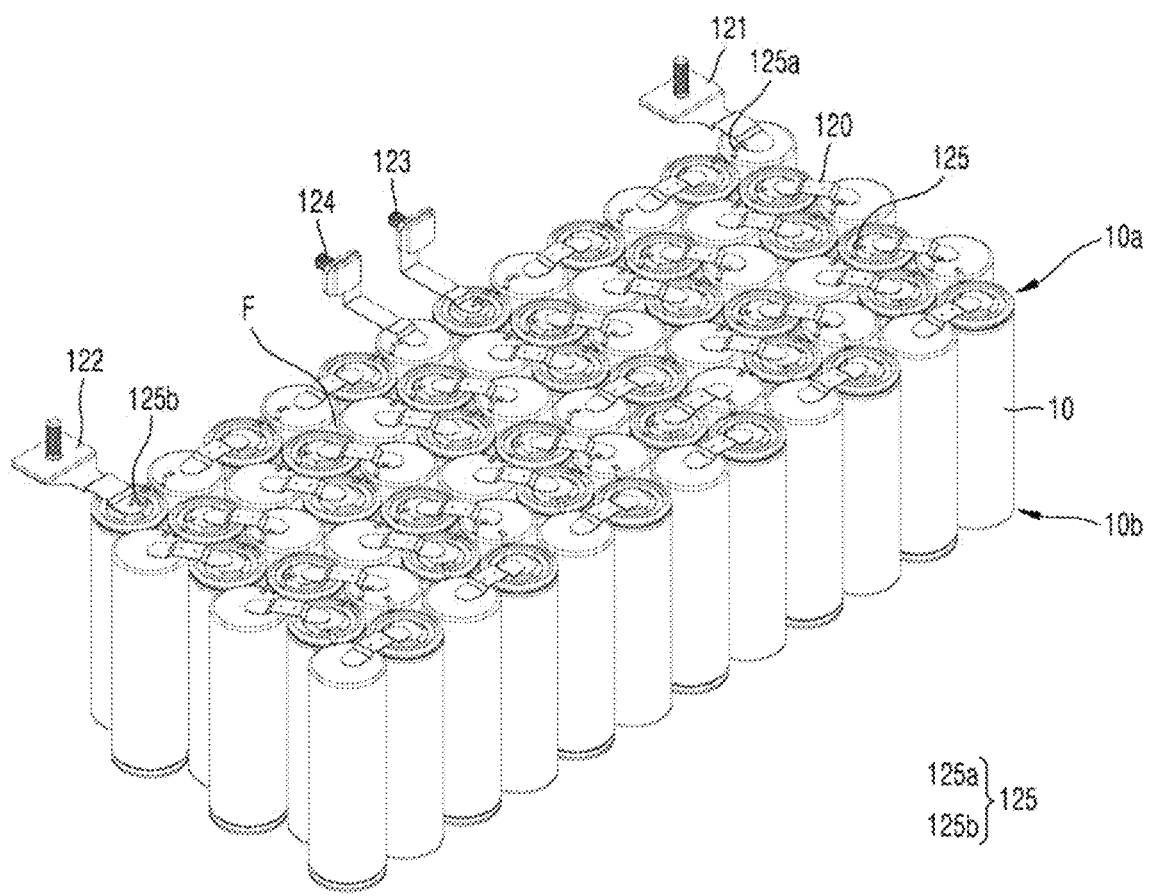
FIGS. 2 and 3 illustrate perspective views of battery cells of FIG. 1.
Figure 3:
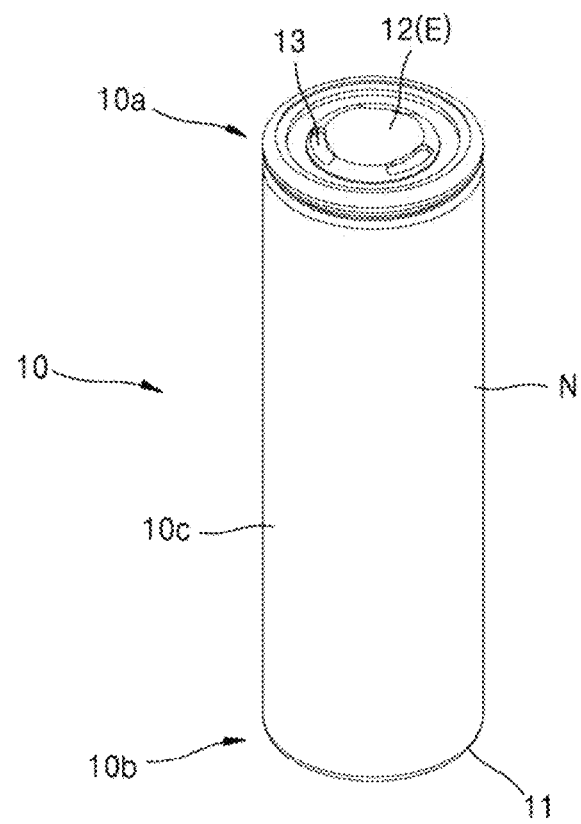
Figure 4:
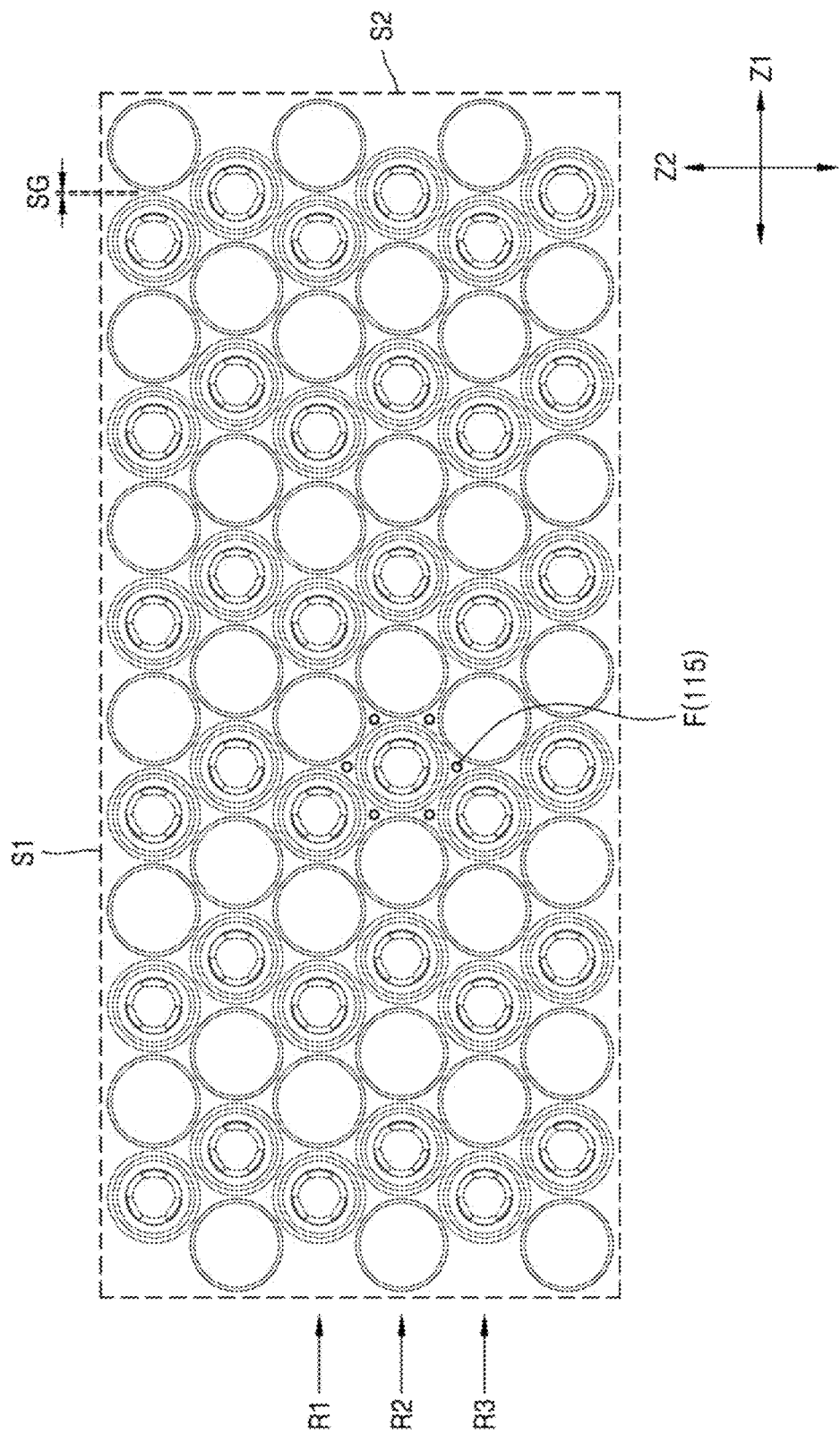
FIG. 4 is a view of the battery cell of FIG. 3 and showing cooling flow paths.
Figure 5:
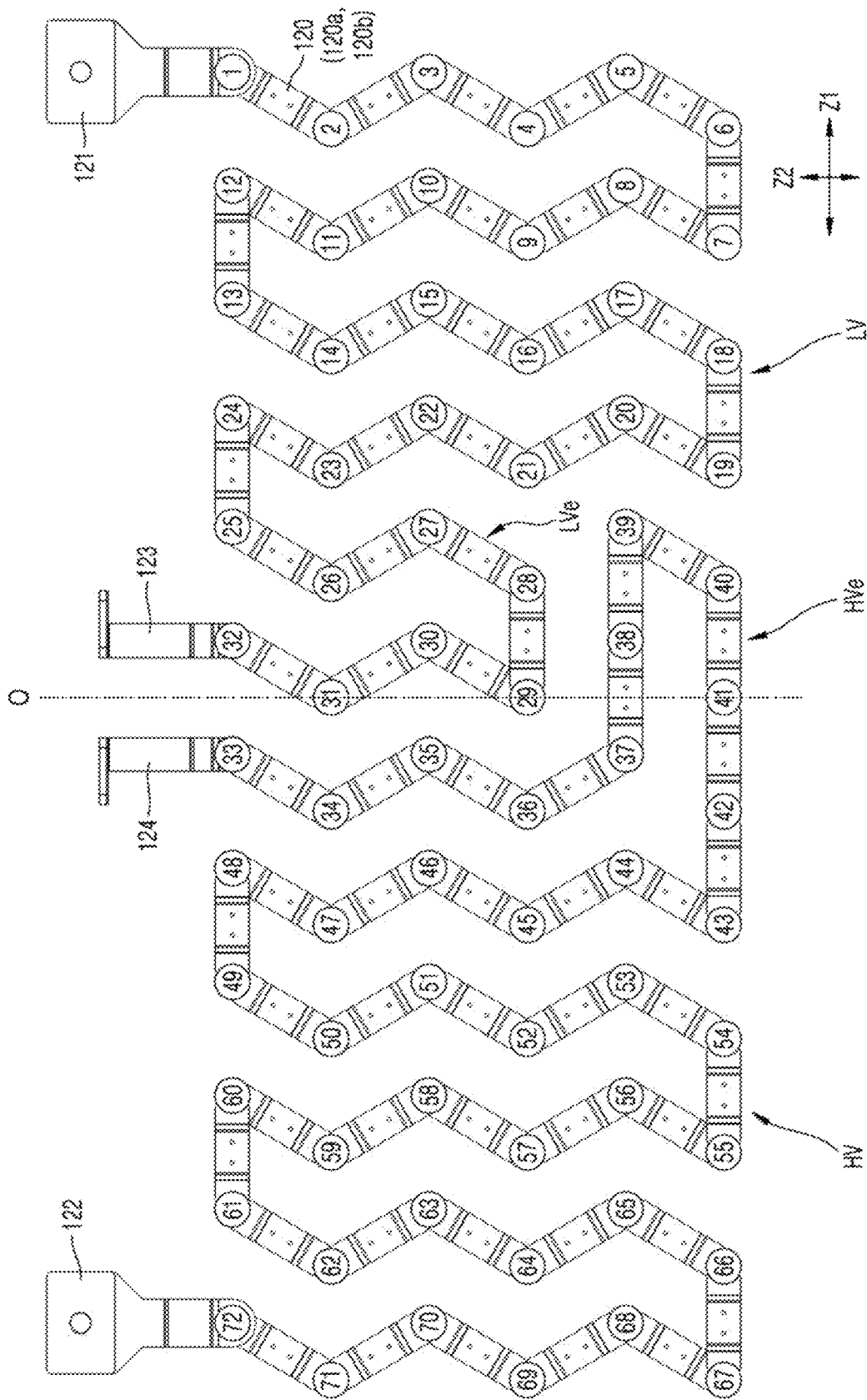
FIG. 5 is a view of an arrangement of multiple bus bars or an electrical connection of battery cells in which multiple bus bars are arranged.
Figure 6A:
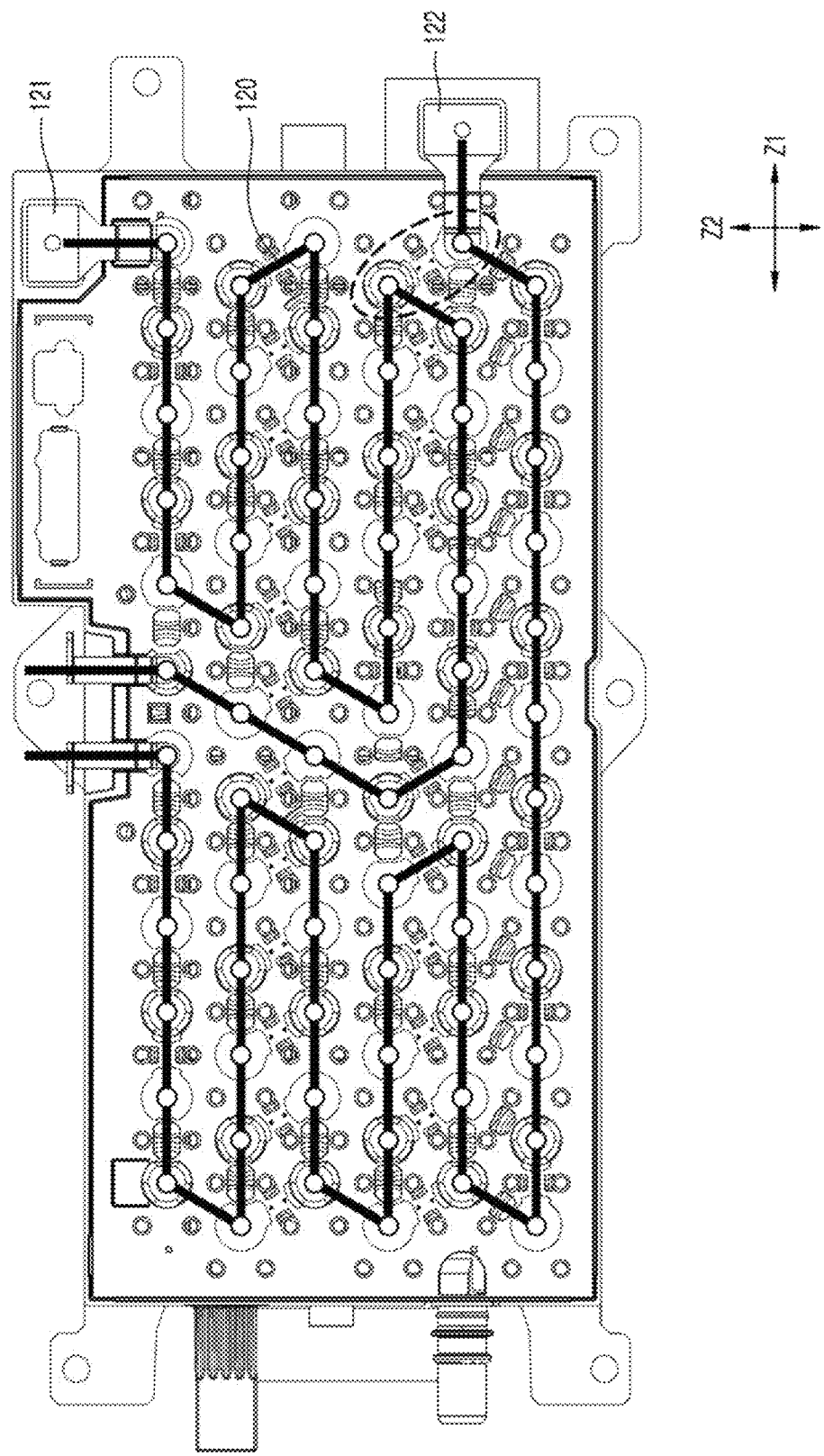
FIGS. 6A to 6C are views of electrical connections according to a comparative example.
Figure 6B:
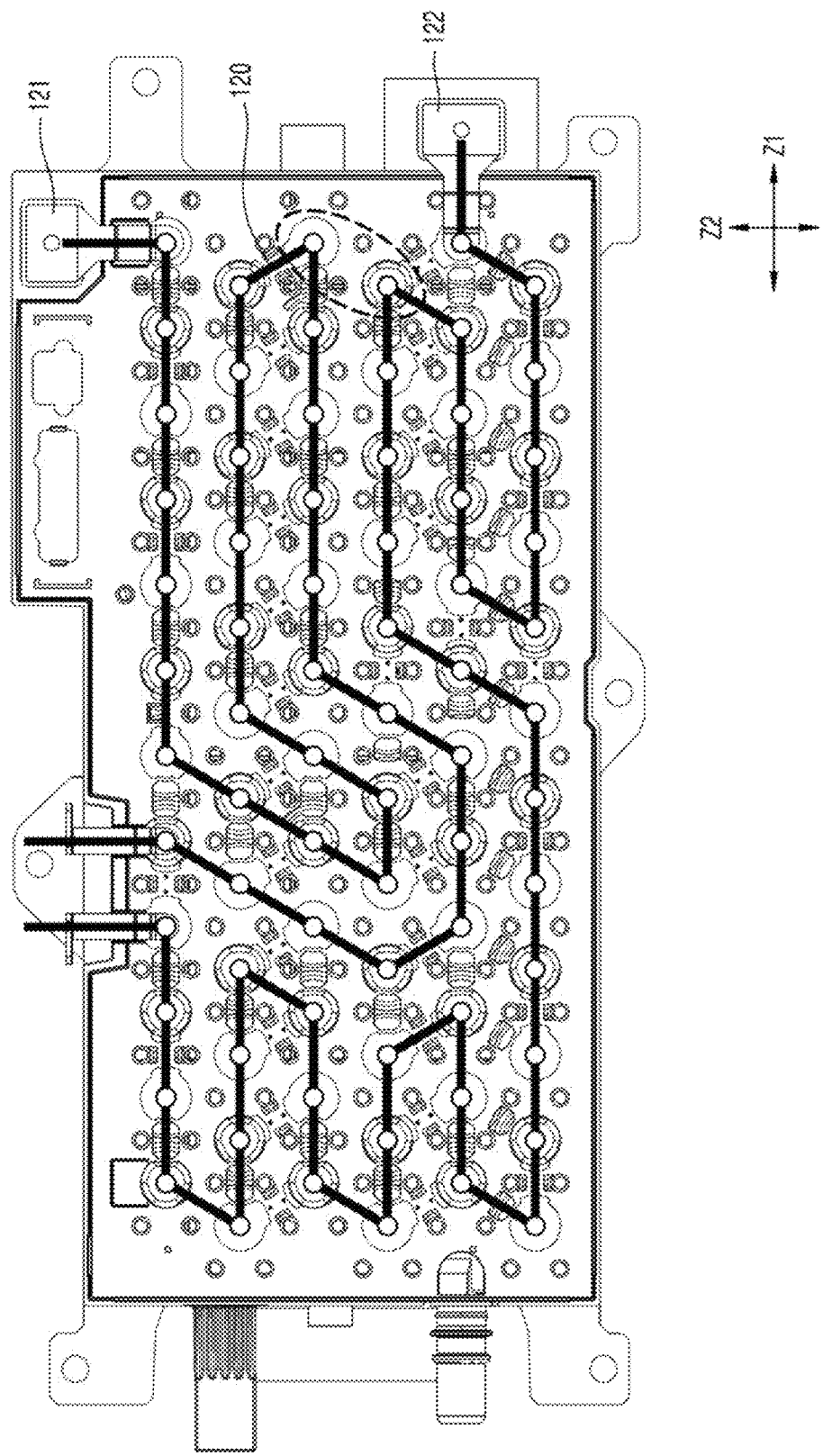
Figure 6C:
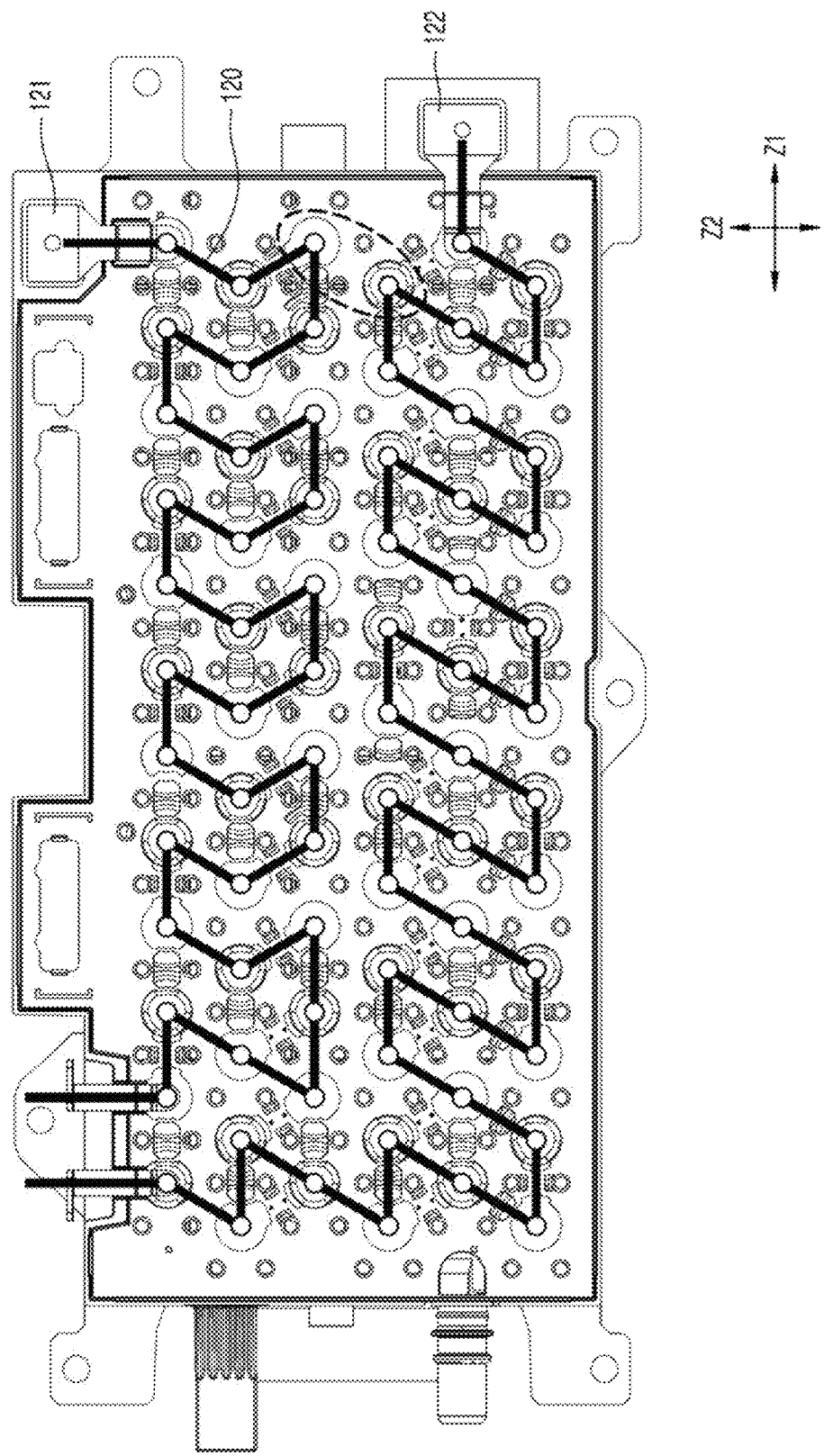
Figure 7:
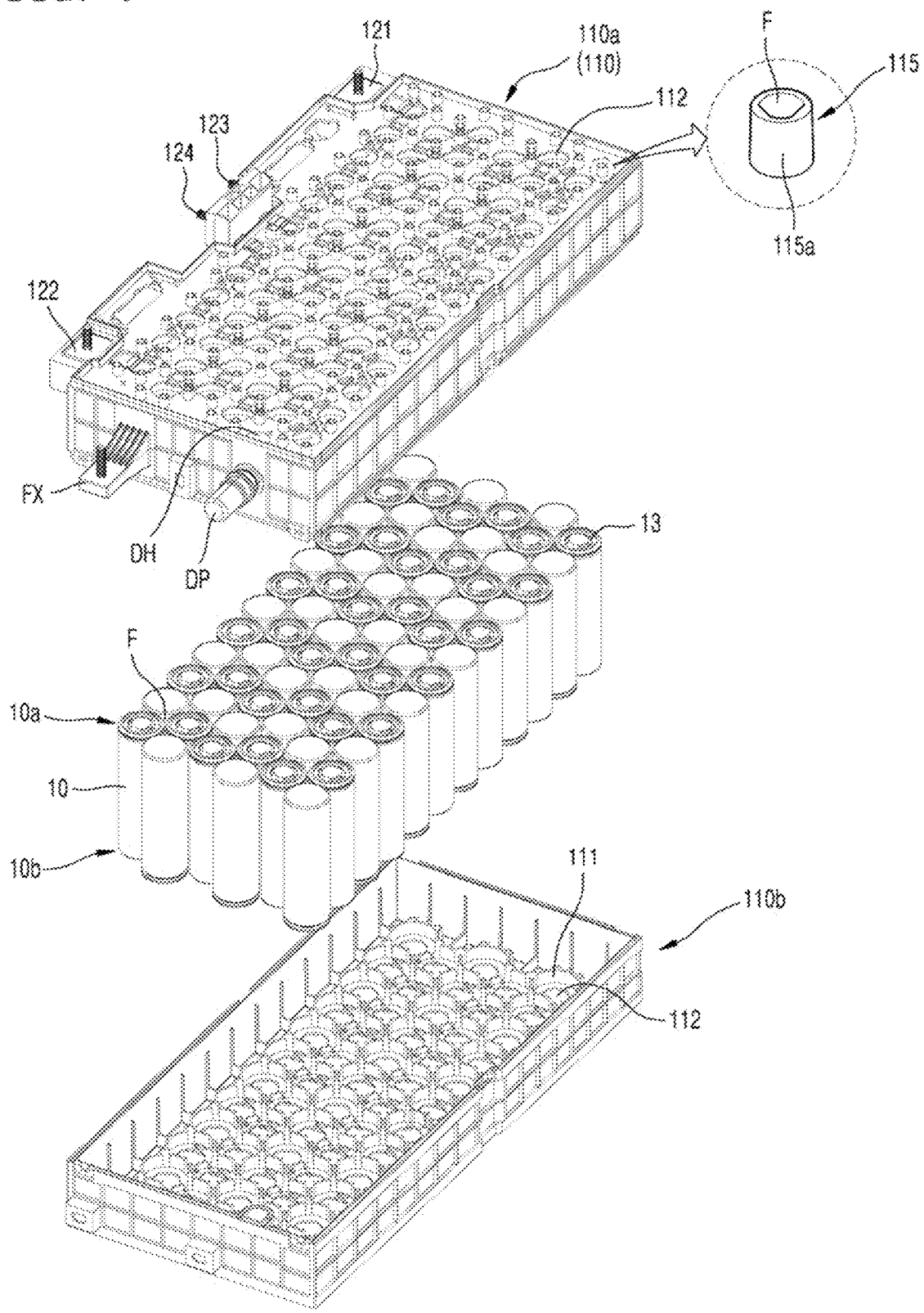
FIG. 7 is an exploded perspective view of a structure of a cell holder in which battery cells are assembled.
Figure 8:
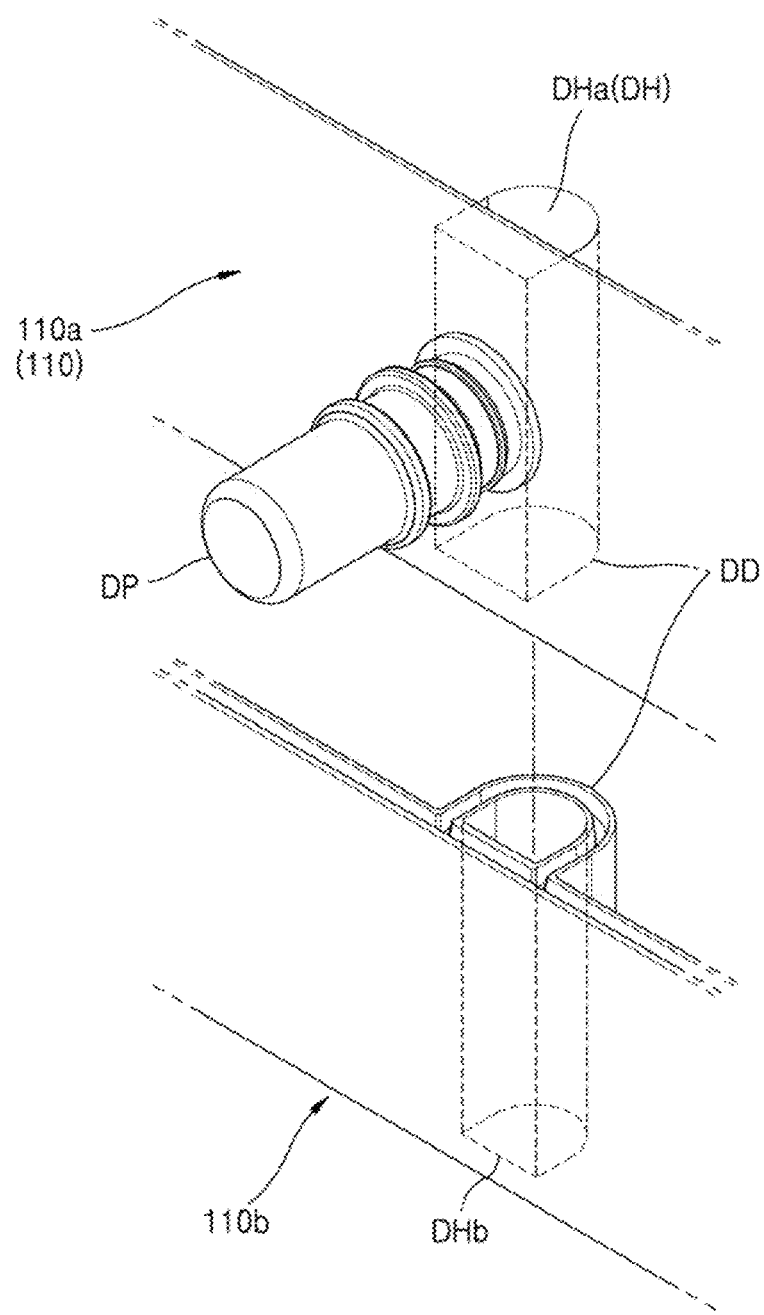
FIG. 8 is an exploded perspective view of an exhaust hole and an exhaust pipe of FIG. 7.
Figure 9:
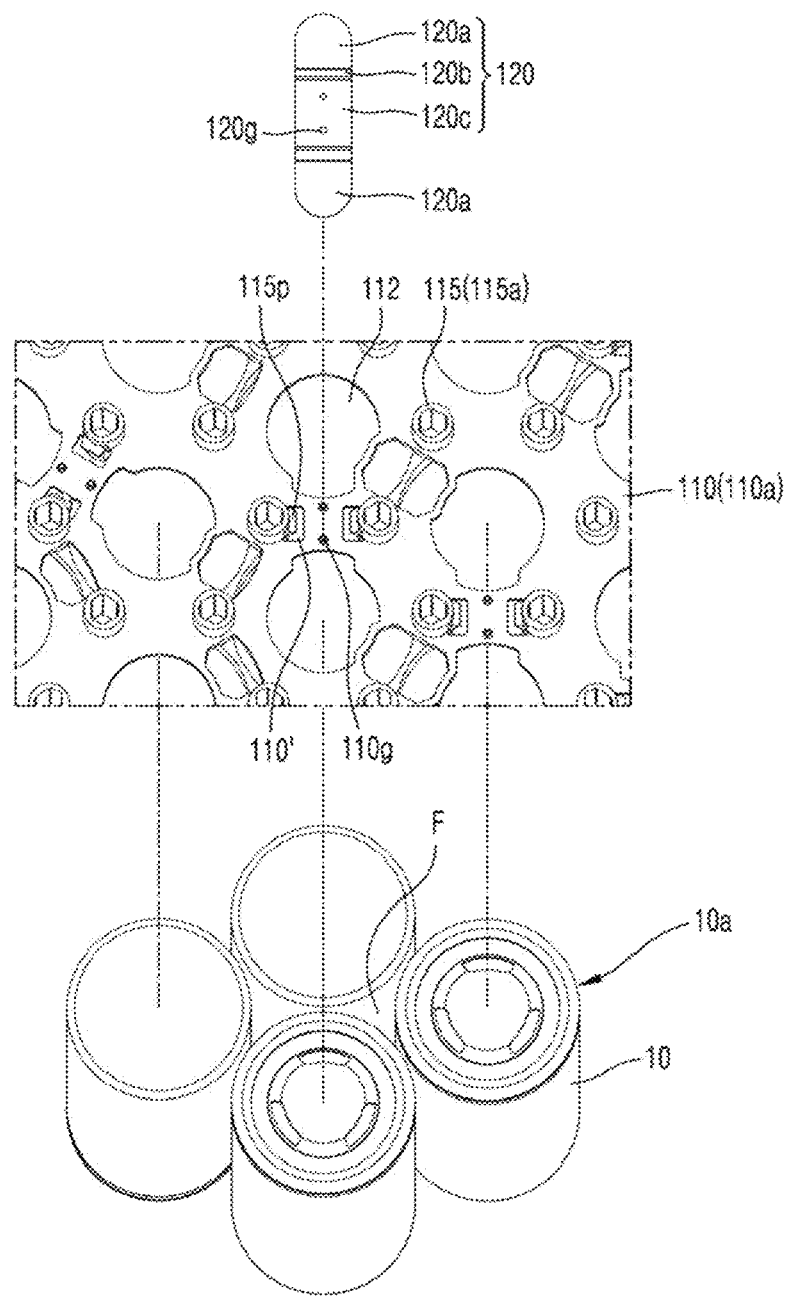
FIG. 9 is a view of assembly of a bus bar and a cell holder.
Figure 10:
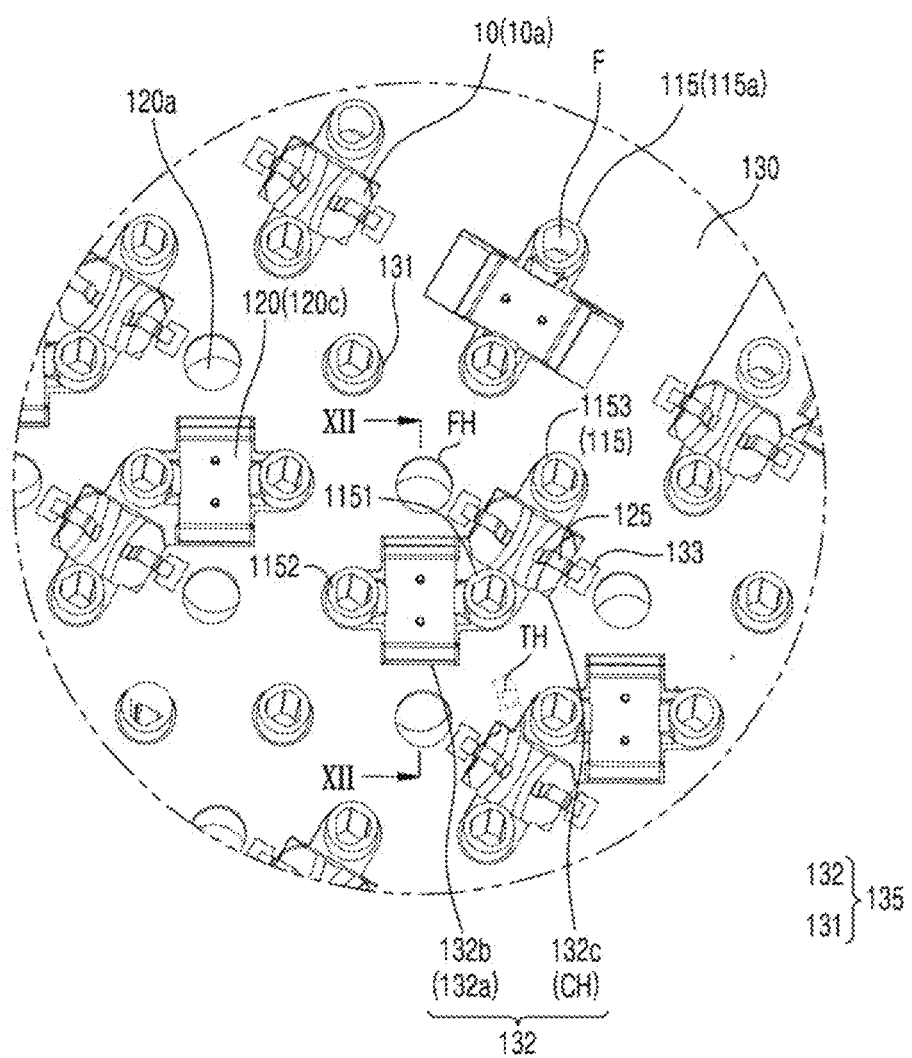
FIG. 10 is a view of a structure of a circuit board illustrated in FIG. 1.
Figure 11:
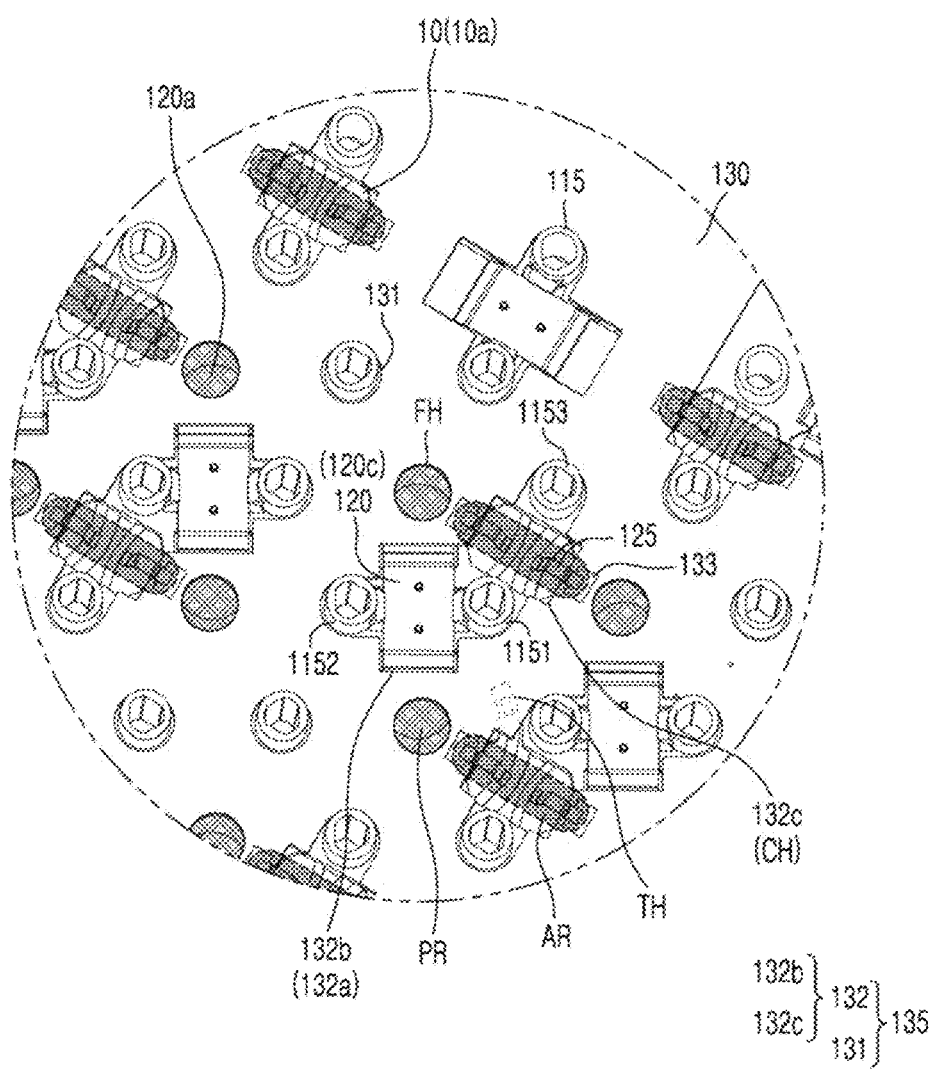
FIG. 11 is a view of a potting resin and an adhesive resin respectively formed in a filling hole and a coupling opening region of FIG. 10.
Figure 12:
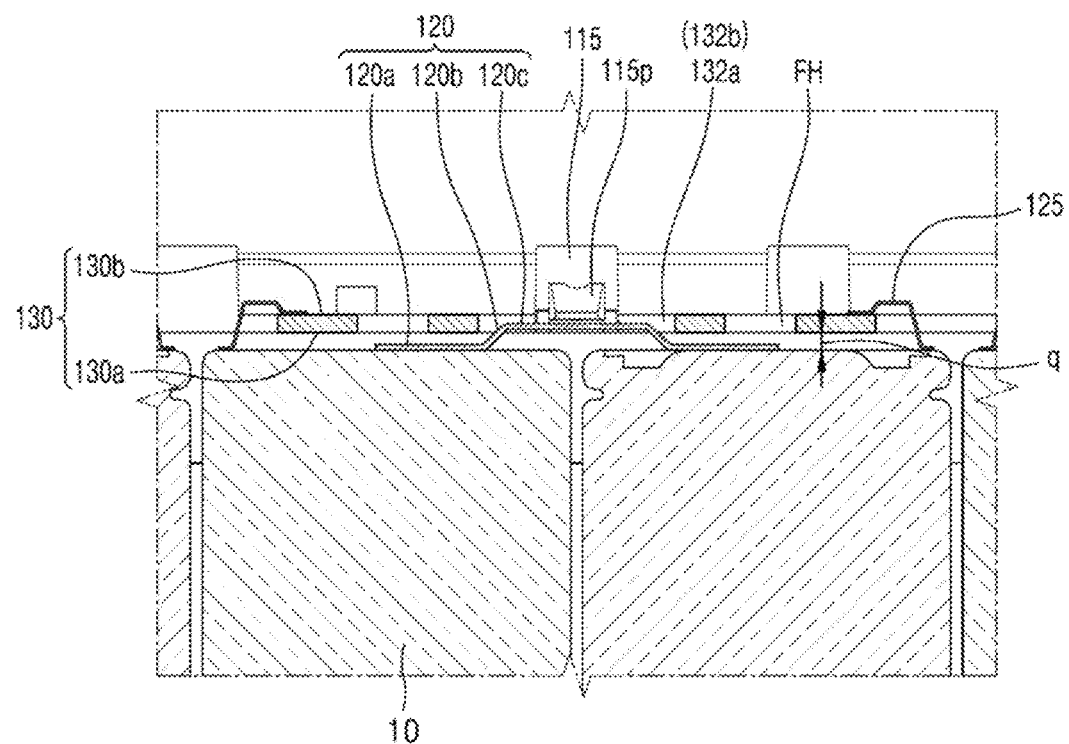
FIG. 12 is a cross-sectional view taken along line XII-XII of FIG. 10.
Figure 13:
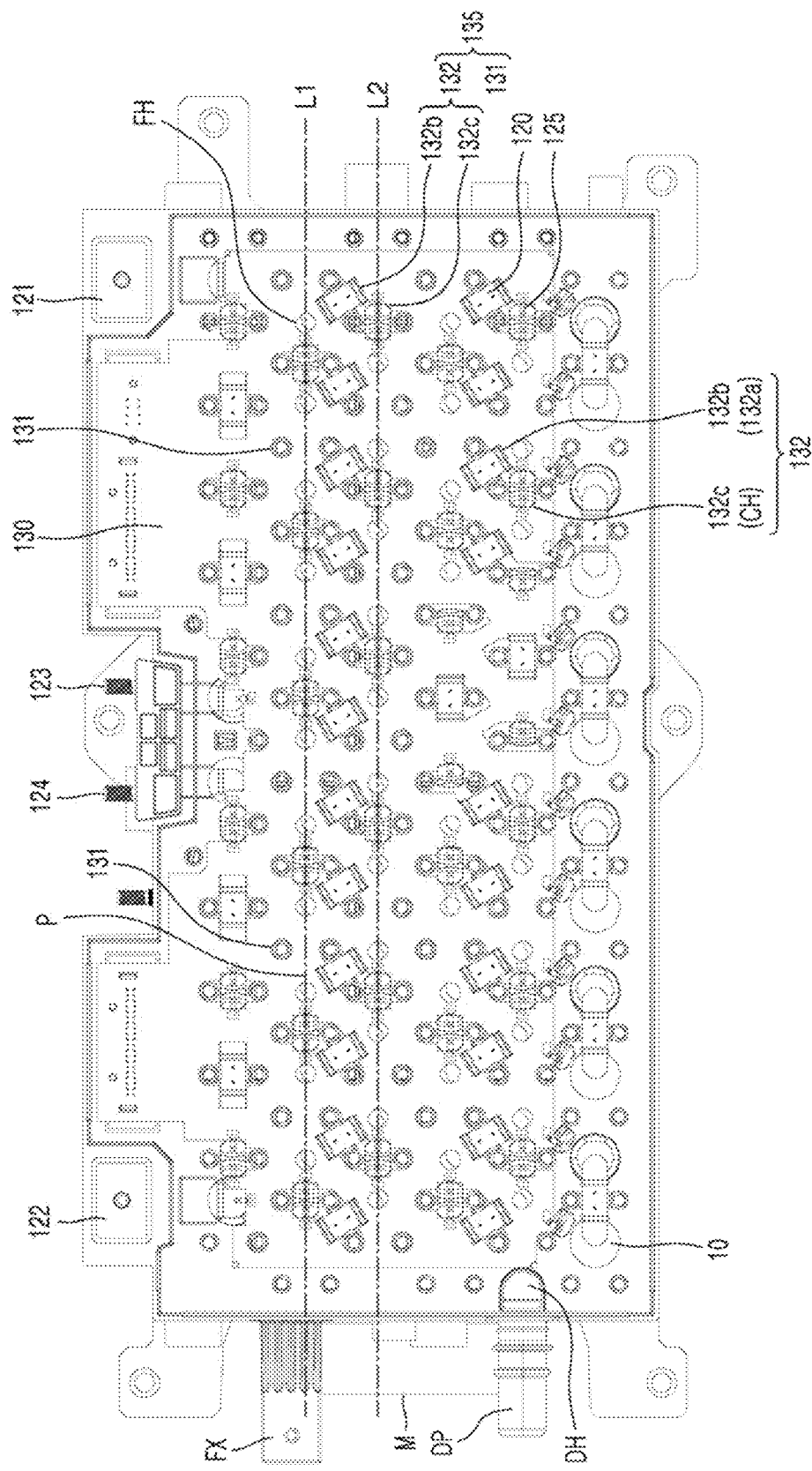
FIG. 13 is a view of first and second opening regions of FIG. 10.
Figure 14:
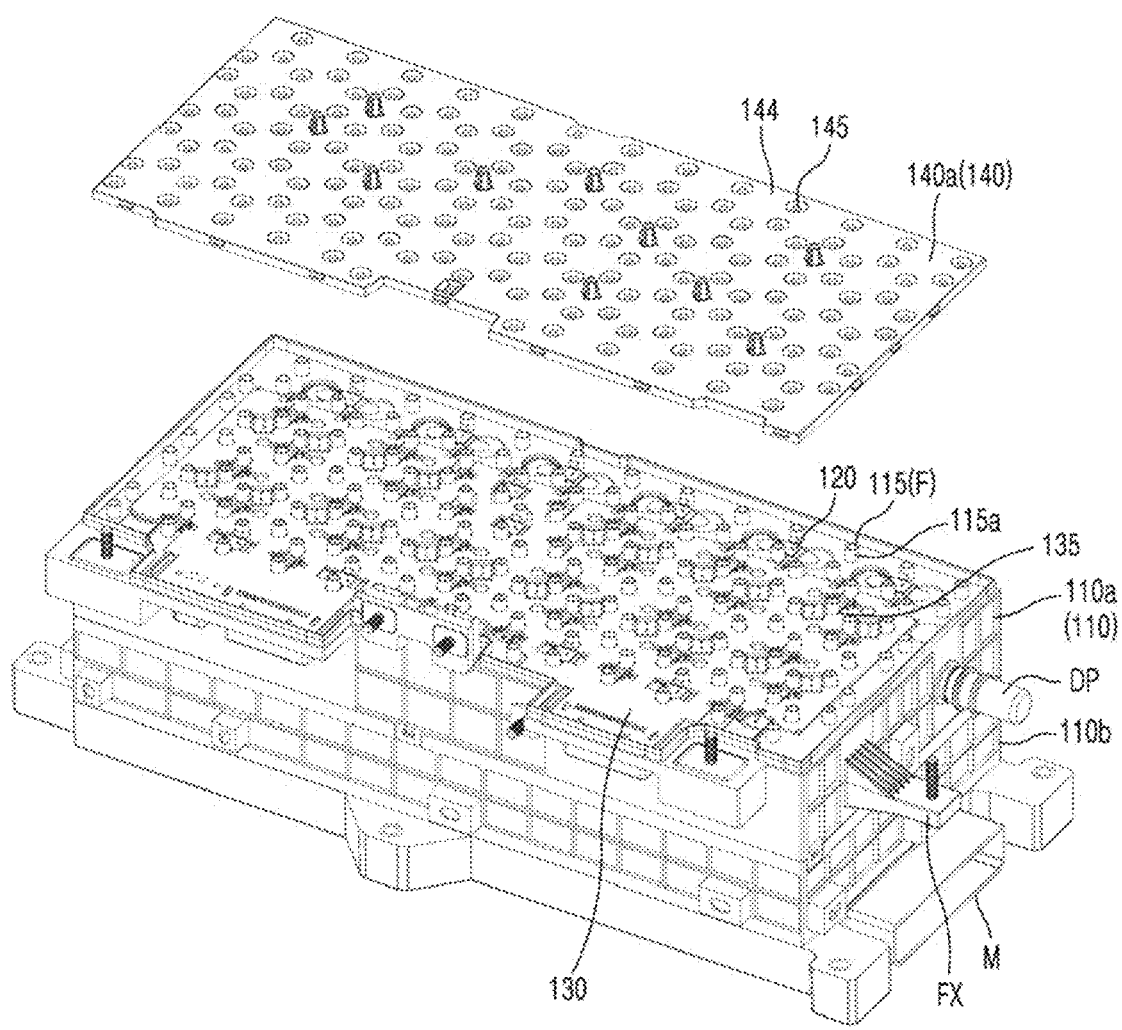
FIGS. 14 and 15 illustrate a separation member of FIG. 1 showing opposite surfaces of upper and lower separation members, respectively.
Figure 15:
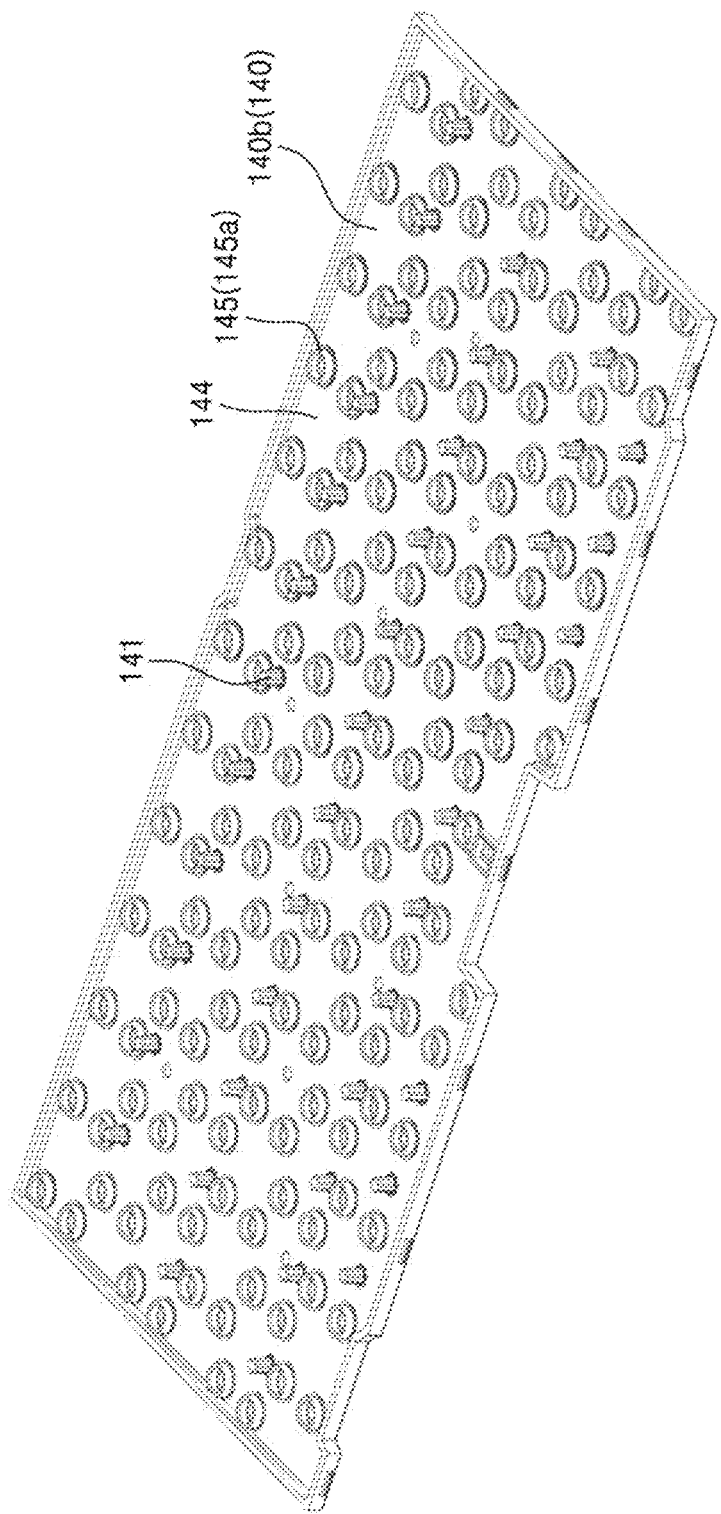
Figure 16:
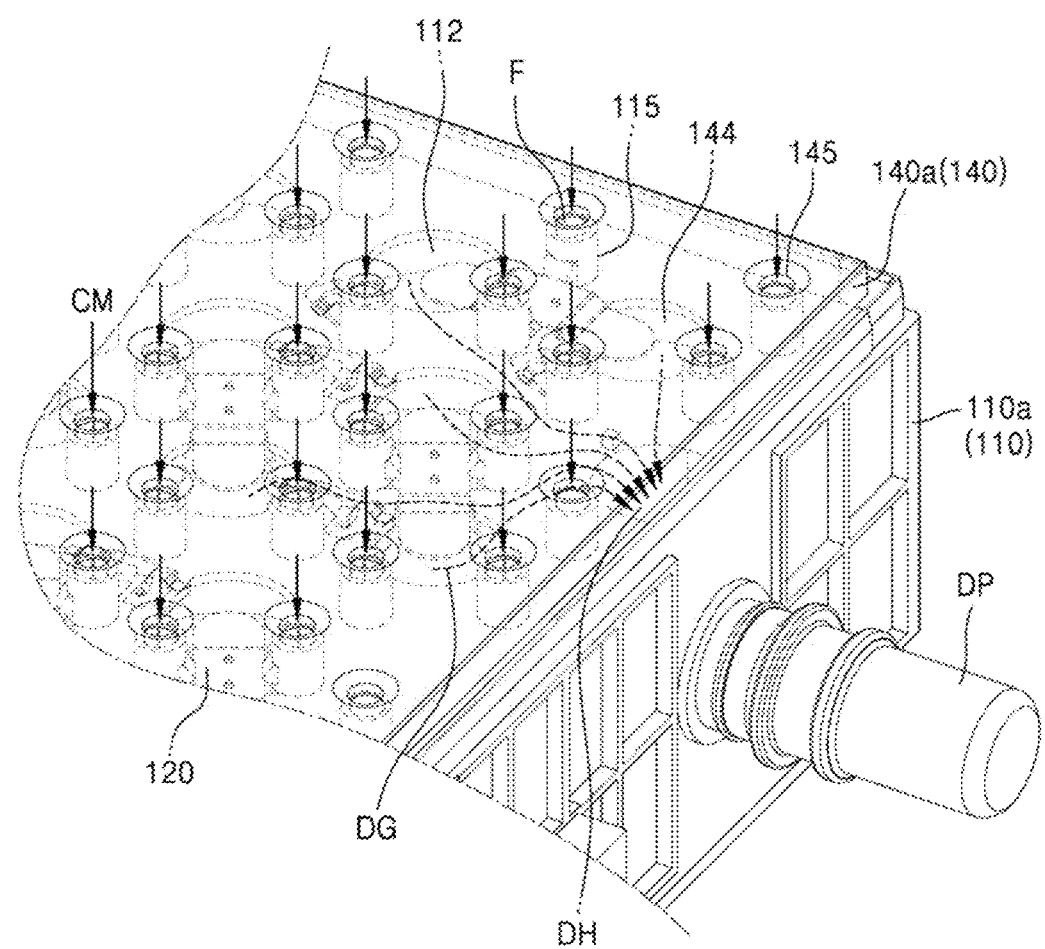
FIG. 16 is a view of a spatial separation of a cooling medium and an exhaust path of a cooling flow path, which is made by the separation member.
Figure 17:
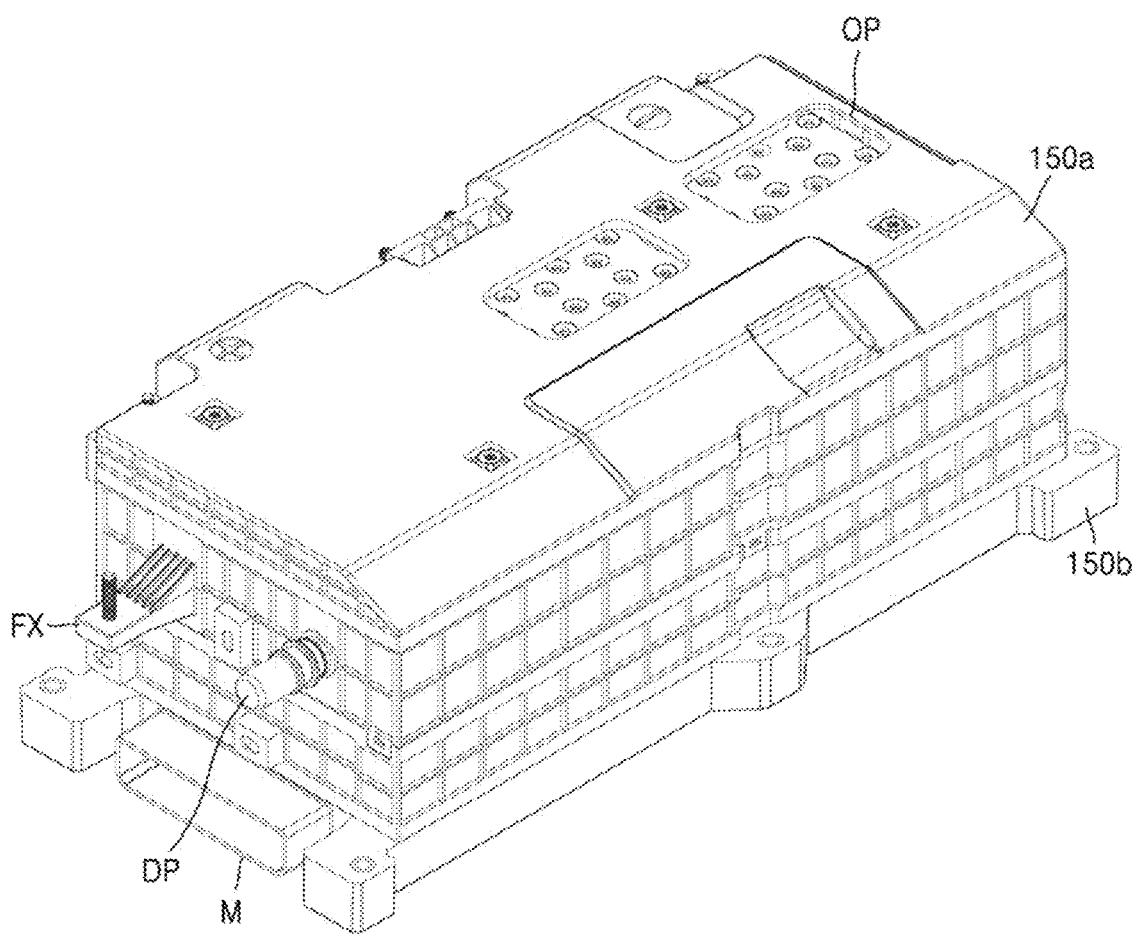
FIG. 17 is a perspective view of an upper duct and a lower duct.

FIG. 1 is an exploded perspective view of a battery pack according to an embodiment; FIGS. 2 and 3 illustrate perspective views of battery cells of FIG. 1; FIG. 4 is a view of the battery cell of FIG. 3 and showing cooling flow paths; FIG. 5 is a view of an arrangement of multiple bus bars or an electrical connection of battery cells in which multiple bus bars are arranged; FIGS. 6A to 6C are views schematically showing electrical connections according to a comparative example; FIG. 7 is an exploded perspective view of a structure of a cell holder in which battery cells are assembled; FIG. 8 is an exploded perspective view of an exhaust hole and an exhaust pipe illustrated in FIG. 7; FIG. 9 is a view of assembly of a bus bar and a cell holder; FIG. 10 is a view of a structure of a circuit board of FIG. 1; FIG. 11 is a view of a potting resin and an adhesive resin respectively formed in a filling hole and a coupling opening region of FIG. 10; FIG. 12 is a cross-sectional view taken along line XII-XII of FIG. 10; FIG. 13 is a view of first and second opening regions of FIG. 10; FIGS. 14 and 15 illustrate a separation member of FIG. 1 showing opposite surfaces of upper and lower separation members, respectively; FIG. 16 is a view of a spatial separation of a cooling medium and an exhaust path of a cooling flow path, which is made by the separation member; and FIG. 17 is a perspective view of an upper duct and a lower duct.

Referring to FIGS. 9 and 10, a battery pack according to an embodiment may include a plurality of battery cells 10 and a plurality of bus bars 120. Each bus bar 120 of the plurality of bus bars 120 may electrically connect different two battery cells 10 (among the plurality of battery cells 10) and may include coupling pieces 120a at both ends (e.g., opposite ends) thereof that are coupled to the two battery cells 10, and a protruding connecting piece 120c at the center thereof that connects the coupling pieces 120c at both ends. The battery pack may further include a circuit board 130 on the plurality of bus bars 120 and electrically connected to at least a portion of the plurality of battery cells 10. The circuit board 130 may include escape holes 132a that expose the protruding connection pieces 120c.

Hereinafter, the battery pack according to an embodiment will be described in more detail.

Referring to FIGS. 2 to 5, the battery cell 10 may include the upper end portion 10a and the lower end portion 10b along a height (e.g., longest axis) direction, and may be a circular battery cell 10 including a cylindrical circumference (e.g., wall) 10c between the upper end portion 10a and the lower end portion 10b. First and second electrodes 11 and 12 with opposite polarities may be formed at the upper end portion 10a and the lower end portion 10b of the battery cell 10, respectively. In an implementation, the first and second electrodes 11 and 12 of the battery cell 10 may correspond to a first polarity (e.g., a negative electrode) and a second polarity (e.g., a positive electrode) of the battery cell 10, respectively, that are opposite to each other. In an implementation, any one of the upper end portion 10a and the lower end portion 10b of the battery cell 10, e.g., the lower end portion 10b, may entirely form the first electrode 11, and a central portion of the other end portion, for example, the upper end portion 10a, may form the second electrode 12 while the edge portion thereof may form the first electrode 11. In an implementation, in the battery cell 10 shown in FIG. 3, the entire lower end portion 10b and the edge portion of the upper end portion 10a may be covered by a can N that integrally extends, thus the entire lower end portion 10b and the edge portion of the upper end portion 10a may have the same polarity and form the first electrode 11, and the central portion of the upper end portion 10a corresponding to a cap assembly E that is electrically insulated from the can N forming the first electrode 11 may form the second electrode 12 having a polarity opposite to that of the first electrode 11.

In an implementation, a circuit board 130 that extends across a plurality of the battery cells 10 may include connection holes CH (see FIG. 1) each exposing the edge portions of the upper end portions 10a of a pair of adjacent battery cells 10, and the edge portions of the upper end portions 10*a* of the battery cells 10 exposed by the connection hole CH may form the first electrodes 11 having the same polarity. In an implementation, the pair of adjacent battery cells 10 exposed by the same connection hole CH may be arranged in a pattern in which one of the pair of adjacent battery cells 10 is inverted in the height direction of the battery cells 10, however, the edge portions of the upper end portions 10*a* of the pair of adjacent battery cells 10 may form the first electrodes 11 having the same polarity regardless of the vertical arrangement of the battery cells 10. In an implementation, as illustrated in FIG. 3, the can N forming the first electrode 11 may extend from the edge portion of the upper end portion 10*a* to the entire lower end portion 10*b*, thus, regardless of the vertical arrangement of the battery cells 10, both the edge portions of the upper end portions 10*a* and the edge portions of the lower end portions 10*b* of the adjacent battery cells 10 may form the first electrodes 11 having the same polarity.

As described below, by way of bus bars 120, the upper end portions 10*a* of the pair of adjacent battery cells 10 may be electrically connected to each other, and the lower end portions 10*b* of the pair of adjacent battery cells 10 may be electrically connected to each other. In this case, the bus bars 120 may connect the central portions of the upper end portions 10*a* of the pair of adjacent battery cells 10 to each other, and may connect the central portions of the lower end portions 10*b* of the pair of adjacent battery cells 10 to each other. As illustrated in FIG. 3, the central portion of the upper end portion 10*a* may be formed as the cap assembly E forming the second electrode 12, the central portion of the lower end portion 10*b* may be formed as the can N forming the first electrode 11, and the central portion of the upper end portion 10*a* of the battery cell 10 or the central portion of the lower end portion 10*b* of the battery cell 10 may form the first electrode 11 or the second electrode 12 according to the vertical arrangement. Through the present specification, in the case where the upper end portion 10*a* and the lower end portion 10*b* of the battery cell 10 form the first electrode 11 and the second electrode 12 or the second electrode 12 and the first electrode 11, respectively, the central portion of the upper end portion 10*a* of the battery cell 10 and the central portion of the lower end portion 10*b* of the battery cell 10 may form the first electrode 11 and the second electrode 12 or the second electrode 12 and the first electrode 11, respectively. In an implementation, in the case where the bus bars 120 connect the upper end portions 10*a* and the lower end portions 10*b* of the pair of adjacent battery cells 10, the bus bars 120 may connect the central portions of the upper end portions 10*a* and the lower end portions 10*b* of the pair of adjacent battery cells 10 to each other.

Through the present specification, the upper end portion 10*a* and the lower end portion 10*b* of the battery cell 10 may refer to an end portion at the top and an end portion at the bottom of the battery cell 10 in the height direction, respectively, according to their positions rather than the first electrodes 11 or the second electrodes 12 that they form. In an implementation, the upper end portions 10*a* of the pair of adjacent battery cells 10 may form the first electrodes 11 or the second electrodes 12 such that the upper end portions 10*a* have the same electrodes, or may form the first electrode 11 and the second electrode 12 such that the upper end portions 10*a* have the electrodes different from each other, according to the arrangement of the battery cells 10.

Referring to FIG. 2, according to an embodiment, the pair of adjacent battery cells 10 may be arranged in a pattern in which one of the battery cells 10 is inverted in the height direction, thus the upper end portions 10*a* of the pair of adjacent battery cells 10 may form the first and second electrodes 11 and 12, and the lower end portions 10*b* of the pair of adjacent battery cells 10 may also form the first and second electrodes 11 and 12.

Each of the pair of battery cells 10 adjacent to each other along an electrical connection route, may be electrically connected to each other, and the pair of adjacent battery cells 10 may be arranged in the pattern in which one of the pair of adjacent battery cells 10 is inverted in the height direction of the battery cells 10 such that the first and second electrodes 11 and 12 of the pair of adjacent battery cells 10 may be connected to each other in series. In an implementation, the first and second electrodes 11 and 12 may be connected to each other in parallel. In an implementation, each of a group of the battery cells 10 that constitutes the battery pack may be connected to the adjacent battery cell 10 in series, and the battery pack according to an embodiment may not include a parallel connection between the pair of adjacent battery cells 10. In an implementation, the battery pack may include serial connections and/or parallel connections between the adjacent battery cells 10.

In an implementation, the pair of battery cells 10 adjacent to each other along the electrical connection route may be arranged in a pattern in which one of the battery cells 10 is vertically inverted, and the first and second electrodes 11 and 12 of the pair of adjacent battery cells 10 may be connected to each other in series, by connecting the upper end portions 10*a* of the pair of adjacent battery cells 10 to each other and the lower end portions 10*b* of the pair of adjacent battery cells 10 to each other. In an implementation, the first and second electrodes 11 and 12 may be connected to each other in parallel.

Through the present specification, the electrical connection route of the battery cells 10 refers to directions in which the adjacent battery cells 10 are electrically connected to each other, rather than a specific single direction, and may include different directions in which the adjacent battery cells 10 are connected to each other by arrangements of the bus bars 120.

In an implementation, the electrical connection route of the battery cells 10 may have a zigzag configuration. As will be described later, the battery cells 10 may be circular battery cells 10, and the battery cells 10 may be alternately arranged such that each of the battery cells 10 is arranged in valley regions of the adjacent battery cells 10 in adjacent columns and thus, may be arranged densely. As described above, the plurality of battery cells 10 alternately arranged may be electrically connected to each other by the plurality of bus bars 120 arranged in zigzag patterns, and the electrical connection route may be formed in a zigzag configuration along the directions in which the plurality of bus bars 120 are arranged.

Referring to FIG. 2, each of the group of the battery cells 10 that constitutes the battery pack may be electrically connected to each other along the electrical connection route in which the plurality of bus bars 120 are arranged, and the battery cell 10 at one end and the battery cell 10 at the other end of the electrical connection route may correspond to a low-potential battery cell 10 having the lowest potential and a high-potential battery cell 10 having the highest potential, respectively, in the group of the battery cells 10. First and second output terminals 121 and 122 may be connected to the low-potential battery cell 10 and the high-potential battery cell 10, respectively.

The first and second output terminals 121 and 122 may provide an electrical connection between the group of battery cells 10 electrically connected to each other and an external device, and the group of battery cells 10 may supply discharge power to an external load through the first and second output terminals 121 and 122 or may receive charge power from an external charger through the first and second output terminals 121 and 122.

First and second fuse terminals 123 and 124 may be between the first and second output terminals 121 and 122 to be connected to a fuse box that may be between the first and second output terminals 121 and 122 to constitute a charge/discharge path. The fuse box may constitute the charge/discharge path between the first and second output terminals 121 and 122, and thus, the charge/discharge path of the group of the battery cells 10 may pass through the fuse box through the first and second fuse terminals 123 and 124 connected to the fuse box. A fuse for blocking an overcurrent may be installed in the fuse box, and the charge/discharge path may be blocked in response to the overcurrent.

In an implementation, the first and second fuse terminals 123 and 124 may be connected to a pair of battery cells 10, respectively, that are between the low-potential battery cell 10 at the one end and the high-potential battery cell 10 at the other end of the electrical connection route of the battery cells 10 along which the plurality of bus bars 120 are arranged, and thus, the pair of battery cells 10 may be electrically connected to each other through the fuse box connected to the first and second fuse terminals 123 and 124. In an implementation, the first and second fuse terminals 123 and 124 may correspond to fuse terminals closest to the first and second output terminals 121 and 122, respectively, along the electrical connection route of the battery cells 10 along which the plurality of bus bars 120 are arranged.

Cooling flow paths F may be between the pairs of adjacent battery cells 10. A cooling medium flowing through the cooling flow paths F may contact and cool the battery cells 10. The cooling flow paths F may pass between the adjacent battery cells 10 in the height direction of the battery cells 10 and extend to the outside of the battery cells 10, and the cooling flow paths F to pass through substantially the entire battery pack may be fluidly connected to the outside of the battery pack through inlets and outlets of the cooling flow paths F. In this case, the cooling flow paths F may extend across the battery pack to pass through substantially the entire battery pack along the height direction of the battery cells 10. The cooling flow path F will be described in more detail later.

Referring to FIG. 3, a vent portion 13 may be formed at at least one of the upper end portion 10a and the lower end portion 10b of the battery cell 10. In the case where the vent portion 13 is formed at one end of the battery cell 10, the vent portion 13 may be formed along an edge portion of the one end of the battery cell 10. In an implementation, the vent portion 13 may be formed along an edge of the second electrode 12 formed at the central portion of the one end of the battery cell 10, and may be formed along the edge portion of the one end of the battery cell 10.

In an implementation, a plurality of vent portions 13 spaced apart from each other may be formed along the edge portion of the one end of the battery cell 10. The vent portion 13 is to relieve an internal pressure of the battery cell 10, and for example, the vent portion 13 may formed at a portion with a relatively low strength in the one end of the battery cell 10. If the internal pressure of the battery cell 10 exceeds a predefined critical pressure (corresponding to a rupture pressure of the vent portion 13), the vent portion 13 may be ruptured to relieve the internal pressure.

Referring to FIG. 1, exhaust gas discharged through the vent portion 13 by the internal pressure of the battery cell 10 may be discharged to the outside of the battery pack along the exhaust gas path of which one side is blocked by a blocking region 144 of a separation member 140. In an implementation, the blocking region 144 corresponding to the vent portions 13 of the battery cells 10 may be formed in the separation member 140, and the exhaust gas discharged through the vent portions 13 may be discharged to the outside of the battery pack through the exhaust gas path between the blocking region 144 of the separation member 140 and the battery cells 10. The separation member 140 and the exhaust gas path will be described in more detail later.

Hereinafter, the arrangements of the battery cells 10 and positions of the cooling flow paths F between the battery cells 10 according to an embodiment will be described with reference to FIG. 4.

The cooling flow paths F may be formed between the adjacent battery cells 10. In an implementation, the battery cells 10 may be circular battery cells 10, the battery cells 10 may be alternately arranged such that each of the battery cells 10 is arranged in valley regions of the adjacent battery cells 10 in adjacent columns and thus, may be arranged densely by utilizing spaces between the adjacent battery cells 10, and accordingly dead spaces may be reduced and the battery pack may have a relatively high energy density compared to its area.

In an implementation, the battery cells 10 may be arranged along a column direction Z1 of the battery cells 10, and may be alternately arranged such that each of the battery cells 10 is arranged in valley regions of the adjacent battery cells in adjacent columns. The column direction Z1 of the battery cells 10 may refer to a direction in which the battery cells 10 are linearly arranged. The column direction Z1 of the battery cells 10 may be different from directions in which the plurality of battery cells 10 are electrically connected, that is, the directions constituting the electrical connection route of the battery cells 10, and the column direction Z1 of the battery cells 10 may refer to a direction in which the battery cells 10 are arranged, regardless of electrical connection states of the battery cells 10.

In an implementation, the battery cells 10 may be linearly arranged along the column direction Z1, and may be arranged in a zigzag configuration along a row direction perpendicular to the column direction Z1. In an implementation, the battery cells 10 having the circumferences adjacent to each other may be linearly arranged along the column direction Z1, and may be arranged in the zigzag configuration along the row direction perpendicular to the column direction Z1. In this case, the battery cells 10 having the circumferences adjacent to each other may be arranged such that, e.g., in the group of the battery cells 10 that constitutes the battery pack, distances between the circumstances of the adjacent battery cells 10 are equal to a minimum gap SG. In an implementation, the minimum gap SG may be set to secure electrical insulation between the adjacent battery cells 10 and sufficient heat dissipation, and for example, the minimum gap SG may be about 1 mm.

In an implementation, supposing that the group of battery cells 10 that constitutes the battery pack is surrounded by a rectangular envelope S1 and S2 consisting of a pair of long side lines S1 and a pair of short side lines S2 that extend to linearly surround the circumference of the group of battery cells 10, the column direction Z1 in which the battery cells 10 are linearly arranged may correspond to a direction parallel to the long sides S1 of the envelope S1 and S2, and the row direction in which the battery cells 10 are arranged in the zigzag configuration may correspond to a direction similar to the short sides S2 of the envelope S1 and S2.

Referring to FIG. 4, the battery cells 10 of first and second columns R1 and R2 may be densely arranged such that the battery cells 10 of the first column R1 are in valley regions of the battery cells 10 of the second column R2, and similarly, the battery cells 10 of the second column R2 and a third column R3 may be densely arranged such that the battery cells 10 of the second column R2 are in valley regions of the battery cells 10 of the third column R3.

Each of the battery cells 10 may be in the valley regions of the (e.g., pairs of) adjacent battery cells 10, thus the circumferences of three battery cells 10 may be adjacent to each other around the battery cells 10, and the cooling flow path F may be formed between the three battery cells 10. The cooling flow path F may be formed in a spare region between the three battery cells 10, of which circumferences are adjacent to each other, that is not occupied by the battery cells 10, that is, a valley region.

In an implementation, the cooling flow paths F may be formed between the battery cells 10 of the first column R1 and the battery cells 10 of the second column R2 adjacent to each other, and one cooling flow path F may be formed between two battery cells 10 of the first column R1 and one battery cell 10 of the second column R2, and one cooling flow path F may be formed between two battery cells 10 of the second column R2 and one battery cell 10 of the first column R1. Similarly, the cooling flow paths F may be formed between the battery cells 10 of the second column R2 and the battery cells 10 of the third column R2 adjacent to each other, and one cooling flow path F may be formed between two battery cells 10 of the second column R2 and one battery cell 10 of the third column R3, and one cooling flow path F may be formed between two battery cells 10 of the third column R3 and one battery cell 10 of the second column R2.

Referring to FIG. 4, six cooling flow paths F may be formed along the circumferential direction of one battery cell 10 of the second column R2. In an implementation, one battery cell 10 of the second column R2 may form a plurality of valley regions between six battery cells 10 (the battery cells 10 of the first to third columns R1, R2, and R3) along the circumferential direction, may form a total of six valley regions between every two battery cells 10 sequentially along the circumferential direction, and may form a total of six cooling flow paths F, one for each of the six valley regions.

Hereinafter, the arrangements of the plurality of bus bars 120 and the electrical connection of the battery cells 10 in which the plurality of bus bars 120 are arranged will be described with reference to FIGS. 4 and 5. For reference, in FIG. 5, for convenience of understanding, upper bus bars (see FIG. 1) and lower bus bars (see FIG. 1) are shown together, and the entire electrical connection by the upper bus bars and the lower bus bars is shown. Hereinafter, the upper bus bar and the lower bus bar will be collectively referred to as the bus bar 120 without being distinguished from each other. In an implementation, the electrical connection shown in FIG. 5 may be implemented through the upper bus bars and the lower bus bars alternately arranged on upper and lower portions of a cell holder 110. The numbers in the circles shown in FIG. 5 may indicate an order of the battery cells 10 counted along the electrical connection route.

Referring to FIGS. 4 and 5, the plurality of bus bars 120 that electrically connect the pair of adjacent battery cells 10 may be arranged in a zigzag configuration. In an implementation, the battery cells 10 may be circular battery cells 10, and the battery cells 10 may be alternately arranged such that each of the battery cells 10 is arranged in valley regions of the adjacent battery cells 10 in adjacent columns and thus, may be arranged densely.

In an implementation, supposing that the group of battery cells 10 that constitutes the battery pack is surrounded by the (e.g., imaginary) rectangular envelope S1 and S2 consisting of the pair of long side lines S1 and the pair of short side lines S2 that extend to linearly surround the circumference of the group of battery cells 10, the group of battery cells 10 that constitutes the battery pack may be configured in arrangements in the column direction Z1 that linearly extends in parallel with the direction of the long side line S1 and arrangements in the row direction that extends in a zigzag shape similar to the direction of the short side line S2. That is, the row direction that extends in the zigzag shape may be similar to the direction Z2 of the short side line S2, that is shorter than the long side line S1, rather than the direction Z1 of the long side line S1 of the group of battery cells 10. In this case, the plurality of bus bars 120 that electrically connect the adjacent battery cells 10 may be arranged in the zigzag shape while connecting the adjacent battery cells 10 along the arrangements of the battery cells 10 in the row direction that extends in the zigzag shape.

In the present disclosure, the arrangements of the plurality of bus bars 120 and the electrical connection route of the battery cells 10 along which the bus bars 120 are arranged may be configured in the row direction similar to the direction Z2 of the short side line S2 shorter than the long side line S1, rather than in the column direction Z1 parallel to the direction of the long side line S1, thus potential differences (voltages) between the battery cells 10 electrically connected to each other in one arrangement along the row direction and the battery cells 10 electrically connected to each other in the arrangement adjacent to the one arrangement along the row direction may be reduced, and for example, by reducing the potential differences between the battery cells 10 in the adjacent arrangements along the row direction Z1, a risk of an electrical short between the adjacent battery cells 10 may be reduced and the safety of the battery pack may be improved. The battery cells 10 in the one arrangement and the adjacent arrangement may be electrically connected to each other through the bus bars 120 in an arrangement in the row direction that extends in the zigzag shape and may be arranged to be adjacent to each other along the column direction Z1 perpendicular to the row direction. In this case, a maximum potential difference (maximum voltage) between the battery cells 10 adjacent to each other along the column direction Z1 in the adjacent arrangements, for example, a maximum potential difference (maximum voltage) between the seventh battery cell 10 in the one arrangement and the eighteenth battery cell 10 in the arrangement adjacent to the one arrangement may be calculated by multiplying the number of the bus bars 120 that electrically connect the two battery cells 10, that is, 11, by a full charge voltage of each of the battery cells 10, that is 4.2 V, since a difference equal to the full charge voltage may occur between two adjacent battery cells 10 connected by the bus bar 120. According to an embodiment, the maximum potential difference (maximum voltage) between the two adjacent battery cells 10, the seventh and eighteenth battery cells 10, may be 46.2 V. As will be described below, the battery pack according to an embodiment may have a 72-cell structure in which 72 battery cells 10 are configured, and may include a high-voltage excursion HVe for compatibility with a 64-cell structure in which 64 battery cells 10 are configured, in which case, a maximum potential difference (maximum voltage) between two adjacent battery cells 10, the nineteenth and fortieth battery cells 10, may be 88.2 V. It may be determined that the safety of the battery pack is improved, in that in comparative examples shown in FIGS. 6A to 6C, maximum potential differences (maximum voltages) between the two adjacent battery cells 10 are greater than 200 V or approaches 200 V.

If the arrangements of the plurality of bus bars 120 were to be configured along the column direction Z1 rather than the row direction, the number of pairs of adjacent battery cells 10 arranged along the column direction Z1, in which each pair of adjacent battery cells 10 are electrically connected to each other through the bus bar 120, is greater than the number of pairs of adjacent battery cells 10 arranged along the row direction, thus the number of bus bars 120 arranged along the column direction Z1 is also greater than the number of bus bars 120 arranged along the row direction, and accordingly, the maximum voltage between the adjacent battery cells 10 increases, resulting in an increased risk of an electrical short between the adjacent battery cells 10.

Referring to FIG. 5, according to an embodiment, a group of the bus bars 120 that constitutes the battery pack may include the bus bars 120 extending in a zigzag shape along the row direction and the bus bars 120 extending along the column direction Z1, however, the arrangements of the bus bars 120 and the electrical connection route of the battery cells 10 along which the bus bars 120 are arranged may be regarded as being along the row direction. In an implementation, whether the group of the bus bars 120 that constitute the battery pack is arranged along the row direction or the column direction Z1 may be determined by comparing the number of the bus bars 120 along the row direction and the number of the bus bars 120 along the column direction Z1, and according to an embodiment, one bus bar 120 along the column direction Z1 may be arranged per approximately five bus bars 120 along the row direction, thus the arrangements of the bus bars 120 and the electrical connection route of the battery cells 10 along which the bus bars 120 are arranged may be regarded as being along the row direction rather than the column direction Z1.

In an implementation, the arrangements of the bus bars 120 and the electrical connection route of the battery cells 10 along which the bus bars 120 are arranged may be configured along the row direction that extends in a zigzag shape, and the arrangement, as one unit, in which the bus bars 120 extend along the row direction may be repeatedly configured along the column direction Z1, and in this case, the first and second output terminals 121 and 122 may be arranged along the column direction Z1, that is, the direction of the long side lines of the envelope S1 and S2. The first and second output terminals 121 and 122 may be arranged in the direction Z1 of the long side lines of the envelope S1 and S2 that surrounds the group of the battery cells 10, thus electrical connections may be established along the row direction that is similar to the direction Z2 of the short side lines of the envelope S1 and S2, and accordingly, the maximum potential differences (maximum voltages) between the adjacent battery cells 10 may be reduced.

As illustrated in FIGS. 6A to 6C, if the first and second output terminals 121 and 122 were to be arranged along the direction Z2 of the short side lines of the envelope S1 and S2 that surrounds the group of the battery cells 10, the voltage of the adjacent battery cells 10 may be relatively increased as compared with the embodiment illustrated in FIG. 5, and maximum potential differences (maximum voltages) may be generated at portions indicated by the ellipses in FIGS. 6A to 6C, and the maximum potential differences (maximum voltages) may be greater than 200 V or may approach 200 V. In the comparative examples illustrated in FIGS. 6A to 6C, the maximum potential differences (maximum voltages) are 210 V, 180.6 V, and 273 V, respectively.

In the comparative examples illustrated in FIGS. 6A to 6C, the arrangements of the bus bars 120 or the electrical connection route of the battery cells 10 along which the bus bars 120 are arranged are configured along the column direction Z1 parallel to the direction of the long side lines of the envelope S1 and S2 rather than the row direction similar to the direction Z2 of the short side lines of the envelope S1 and S2, and thus, the potential differences between the adjacent battery cells 10 and the risk of an electrical short between the adjacent battery cells 10 may increase. In the comparative example illustrated in FIG. 6C, although the electrical connection route of the battery cells 10 is configured along the row direction similar to the direction Z2 of the short side lines of the envelope S1 and S2, the arrangement, as one unit, in which the bus bars 120 extend along the row direction is repeatedly configured along the column direction Z1 parallel to the direction Z1 of the long side lines of the envelope S1 and S2 while reciprocating along the column direction Z1, and thus, the maximum potential difference (maximum voltage) between the pair of adjacent battery cells 10 in the portion indicated by the eclipse may increase. In an implementation, as illustrated in FIG. 5, the arrangement in which the bus bars 120 extend along the row direction may be repeatedly configured along the column direction Z1 parallel to the direction Z1 of the long side lines of the envelope S1 and S2, from one short side line S2 to the other short side line S2 of the envelope S1 and S2 unidirectionally without reciprocating.

Referring to FIG. 5, according to an embodiment, the group of bus bars 120 and the group of battery cells 10 that constitute the battery pack may be divided into a low-voltage area LV that encompasses from the first output terminal 121 connected to the low-potential battery cell 10 having the lowest potential to the first fuse terminal 123, and a high-voltage area HV that encompasses from the second output terminal 122 connected to the high-potential battery cell 10 having the highest potential to the second fuse terminal 124. In this case, the first and second fuse terminals 123 and 124 may correspond to the fuse terminals, which are connected to the fuse box (not shown), closest to the first and second output terminals 121 and 122, respectively, along the electrical connection route of the battery cells 10, and may be connected to the first and second output terminals 121 and 122 along the electrical connection route without passing through the fuse box.

In an implementation, the boundary between the low-voltage area LV and the high-voltage area HV may be asymmetrical with respect to the line O in FIG. 5 passing between the first and second fuse terminals 123 and 124, and parallel to the direction Z2 of the short side lines of the envelope S1 and S2. For example, the high-voltage area HV may include a high-voltage excursion HVe that passes the line O to extend toward the low-voltage area LV along the direction Z1 of the long side lines of the envelope S1 and S2, and the low-voltage area LV may include a low-voltage excursion LVe aligned toward the opposite side of the high-voltage excursion HVe to be elongated along the direction Z2 of the short side lines while avoiding the high-voltage excursion HVe. In an implementation, the high-voltage excursion HVe and the low-voltage excursion LVe may be arranged at positions opposite to each other along the direction Z2 of the short side lines of the envelope S1 and S2, the low-voltage excursion LVe may be arranged at one position relatively close to the first and second fuse terminals 123 and 124 along the direction Z2 of the short side lines of the envelope S1 and S2, and the high-voltage excursion HVe may be arranged at another position relatively far from the first and second fuse terminals 123 and 124. In an implementation, the high-voltage excursion HVe and the low-voltage excursion LVe may extend along the direction Z1 of the long side lines and the direction Z2 of the short side lines of the envelope S1 and S2, respectively, to be elongated along the respective directions. In an implementation, the high-voltage excursion HVe may be elongated along the direction Z1 of the long side lines rather than the direction Z2 of the short side lines to extend toward the low-voltage area LV, and the low-voltage excursion LVe may be elongated along the direction Z2 of the short side lines rather than the direction Z1 of the long side lines while avoiding the high-voltage excursion HVe.

In an implementation, the high-voltage area HV and the low-voltage area LV may be asymmetrical with respect to the line O, and compatibility of a battery management system (BMS) with the 64-cell structure in which 64 battery cells 10 are configured and the 72-cell structure in which 72 battery cells 10 are configured may be provided. In an implementation, the battery management system (BMS) has a pin-map corresponding to the positions of the battery cells 10 and the fuse box, and in the 64-cell structure, the fuse box (not shown) is located between a pin of number 32 (the thirty-second battery cell along the electrical connection route of the battery cells 10) and a pin of number 33 (the thirty-third battery cell along the electrical connection route of the battery cells 10). In an implementation, in the 64-cell structure, the fuse box may be located a central position, that is, between the thirty-second battery cell 10 and the thirty-third battery cell 10 along the electrical connection route of the battery cells 10.

In an implementation, like the 64-cell structure, the 72-cell structure shown in FIG. 5 may be implemented such that the fuse box is located between the pin of number 32 (the thirty-second battery along the electrical connection route of the battery cells 10) and pin of number 33 (the thirty-third battery cell along the electrical connection route of the battery cells 10), and the battery management system (BMS) may be utilized in common in the 64-cell structure and the 72-cell structure. That is, the battery management system (BMS) having a specific pin-map may be applied in common to the 64-cell structure and the 72-cell structure.

In the 72-cell structure designed to have the compatibility of the battery management system (BMS) with the 64-cell structure according to an embodiment, the number of the bus bars 120 in the high-voltage area HV (or the number of the battery cells 10 in the high-voltage area HV) may be greater than the number of the bus bars 120 in the low-voltage area LV (or the number of the battery cells 10 in the low-voltage area LV), based on the fuse box (not shown) as a boundary along the electrical connection route of the battery cells 10, and the high-voltage area HV including the number of the bus bars 120 greater than that of the low-voltage area LV may include the high-voltage excursion HVe that extends toward the low-voltage area LV, while the low-voltage area LV may include the low-voltage excursion LVe to avoid the high-voltage excursion HVe.

Referring to FIG. 7, the battery cells 10 may be assembled in the cell holder 110. In an implementation, the cell holder 110 may have one (e.g., first) side in which the battery cells 10 are assembled, and another (e.g., second) side on which hollow protrusions 115 connected to the cooling flow paths F between the battery cells 10 adjacent to each other are formed. As described below, the hollow protrusion 115 may extend to penetrate the circuit board 130 on the other side of the cell holder 110. Hereinafter, the cell holder 110 will be described in more detail.

The cell holder 110 may include an upper holder 110a into which the upper end portions 10a of the battery cells 10 are inserted and a lower holder 110b into which the lower end portions 10b of the battery cells 10 are inserted. Except for the upper end portions 10a and the lower end portions 10b of the battery cells 10 inserted into the upper holder 110a and the lower holder 110b, respectively, central portions of the battery cells 10 in the height direction may be exposed between the upper holder 110a and the lower holder 110b. The cooling flow paths F may be formed between the battery cells 10 adjacent to each other, and the central portions of the battery cells 10 exposed between the upper holder 110a and the lower holder 110b may be directly exposed to a cooling medium flowing through the cooling flow paths F and thus, may be cooled. In an implementation, the cooling medium may be low temperature air introduced from the outside of the battery pack. In an implementation, the cooling medium may be a cooling medium in a gas state other than air, e.g., a refrigerant gas.

Assembly ribs 111 into which the upper end portions 10a of the battery cells 10 and the lower end portions 10b of the battery cells 10 are inserted may be formed in the upper holder 110a and the lower holder 110b, respectively, and the assembly rib 111 may restrict an assembly position of the battery cell 10 while surrounding the upper end portion 10a or the lower end portion 10b of the battery cell 10. The assembly rib 111 may protrude from a plate-shaped main body of the cell holder 110 toward the battery cell 10 in the height direction of the battery cell 10, and may support the battery cell 10 while surrounding the upper end portion 10a or the lower end portion 10b of the battery cell 10.

Terminal holes 112 that expose the first and second electrodes 11 and 12 of the battery cells 10 may be formed in the cell holder 110. The first and second electrodes 11 and 12 of the battery cell 10 exposed by the terminal hole 112 may be electrically connected to the adjacent battery cells 10 through the bus bars 120. In an implementation, the terminal hole 112 may be formed in a region surrounded by the assembly rib 111 into which the upper end portion 10a or the lower end portion 10b of the battery cell 10 is inserted.

As illustrated in FIG. 3, according to an embodiment, the vent portion 13 may be formed at at least one of the upper end portion 10a and the lower end portion 10b of the battery cell 10, and the vent portion 13 may be formed along the edge surrounding the second electrode 12 formed at the one end portion of the battery cell 10. Referring to FIG. 7, the terminal hole 112 may have a sufficient size (e.g., diameter) to expose the second electrode 12 of the battery cell 10 and the vent portion 13 formed along the edge portion of the one end portion of the battery cell 10. In an implementation, the pair of adjacent battery cells 10 may be arranged in the pattern in which one of the pair of the battery cells 10 is inverted in the height direction, accordingly, the vent portion 13 of the battery cell 10 may be formed at the upper end portion 10a or the lower end portion 10b of the battery cell 10 according to a position of the battery cell 10, and in this case, the terminal holes 112 formed at the upper and lower holders 110a and 110b may have a sufficient size (e.g., diameter) to expose the vent portions 13 formed at the upper end portions 10a and the lower end portions 10b of the battery cells 10, respectively.

Referring to FIG. 7, the exhaust gas discharged through the vent portions 13 of the battery cells 10 may flow along the exhaust gas path formed on the cell holder 110 through the terminal holes 112 of the cell holder 110, and may be discharged to the outside of the battery pack through an exhaust hole DH formed at one side of the cell holder 110. In an implementation, the exhaust hole DH may be formed at one side of the cell holder 110, and the exhaust hole DH may be fluidly connected to the vent portions 13 of the plurality of battery cells 10 to collect the exhaust gas discharged from the vent portions 13 and discharge the collected exhaust gas to the outside of the battery pack. In an implementation, the exhaust hole DH may be formed at an edge of the cell holder 110, and may be formed at one edge of the cell holder 110 along the direction of long side lines of the cell holder 110.

The direction of the long side lines of the cell holder 110 may correspond to the direction Z1 of the long side lines of the envelope S1 and S2 (refer to FIG. 4) that surrounds the group of the battery cells 10 that constitutes the battery pack. In an implementation, supposing that the group of battery cells 10 that constitutes the battery pack is surrounded by the rectangular envelope S1 and S2 (see FIG. 4) consisting of the pair of long side lines S1 and the pair of short side lines S2 that extend to linearly surround the circumference of the group of battery cells 10, the direction Z1 of the long side lines of the envelope S1 and S2 may correspond to the direction of the long side lines of the cell holder 110.

Referring to FIG. 7, according to an embodiment, a plurality of battery cells 10 may be arranged in the pattern in which one of the pair of adjacent battery cells 10 is inverted in the height direction of the battery cells 10. In an implementation, the plurality of battery cells 10 may include a first group and a second group of the battery cells 10, such that the battery cells 10 of the first group are vertically inversed or inverted relative to the battery cells 10 of the second group. In an implementation, the battery cells 10 of the first group may have the vent portions 13 formed at the upper end portions 10a thereof, and the battery cells 10 of the second group may have the vent portions 13 formed at the lower end portions 10b thereof.

Referring to FIGS. 7 and 8, the cell holder 110 may include the upper holder 110a in which the upper end portions 10a of the battery cells 10 of the first group are assembled, and the lower holder 110b in which the lower end portions 10b of the battery cells 10 of the second group are assembled, and according to an embodiment, the upper holder 110a and the lower holder 110b may be assembled with each other with the battery cells 10 of the first and second groups interposed therebetween, thereby providing an accommodation space for the battery cells 10 of the first and second groups. In this case, an upper exhaust hole DHa, through which the exhaust gas discharged from the upper end portions 10a (e.g., the vent portion 13) of the battery cells 10 of the first group 10 is collected, may be formed at an upper side of the upper holder 110a, and a lower exhaust hole DHb, through which the exhaust gas discharged from the lower end portions 10b (e.g., the vent portion 13) of the battery cells 10 of the second group 10 is collected, may be formed at a lower side of the lower holder 110b. Here, the exhaust gas path connecting the upper end portions 10a (e.g., the vent portion 13) of the battery cells 10 of the first group to the upper exhaust hole DHa may be formed on the upper side of the upper holder 110a, and the exhaust gas path connecting the lower end portions 10b (e.g., the vent portion 13) of the battery cells 10 of the second group to the lower exhaust hole DHb may be formed on the lower side of the lower holder 110b. Referring to FIG. 1, an upper separation member 140a and a lower separation member 140b that form the respective exhaust gas paths may be arranged on the upper side of the upper holder 110a and the lower side of the lower holder 110b, and the exhaust gas paths may be formed between the upper side of the upper holder 110a and the upper separation member 140a and between the lower side of the lower holder 110b and the lower separation member 140b, respectively. In an implementation, the exhaust gas paths may be formed between the upper side of the upper holder 110a and the blocking region 144 of the upper separation member 140a and between the lower side of the lower holder 110b and the blocking region 144 of the lower separation member 140b. The upper separation member 140a, the lower separation member 140b, and the blocking region 144 will be described in more detail later.

Referring to FIGS. 7 and 8, the upper exhaust hole DHa and the lower exhaust hole DHb may be formed at edge positions of the upper holder 110a and the lower holder 110b that correspond to each other, e.g., at edge positions along the direction of the long side lines the cell holder 110. In addition, an exhaust duct DD may be formed at the edge positions of the upper holder 110a and the lower holder 110b at which the upper exhaust hole DHa and the lower exhaust hole DHb are formed, while continuously extending in the height direction. The exhaust duct DD may be continuously formed through the upper holder 110a and the lower holder 110b in the height direction, more specifically, as the upper holder 110a and the lower holder 110b are assembled, a portion of the exhaust duct DD formed in the upper holder 110a and another portion of the exhaust duct DD formed in the lower holder 110b may be connected to each other, and thus, the complete exhaust duct DD may be formed in a tube shape. In an implementation, the exhaust duct DD may include the portion formed in the upper holder 110a and another portion formed in the lower holder 110b such that the exhaust duct DD is divided into the two portions formed in the upper holder 110a and the lower holder 110b, respectively. For reference, throughout the present specification, the term "height direction" may refer to the height direction of the battery cell 10, and may refer to a lengthwise direction of the battery cell 10, e.g., the direction of the longest dimension or long axis of the battery cell 10.

The exhaust duct DD may form a space separated from the accommodation space for the battery cells 10 formed by assembling the upper holder 110a and the lower holder 110b, and may have a sealed structure except for portions connected to the upper exhaust hole DHa and the lower exhaust hole DHb through which the exhaust gas is introduced, and a portion connected to an exhaust pipe DP through which the exhaust gas is discharged to the outside of the cell holder 110.

The upper exhaust hole DHa and a lower exhaust hole DHb may be connected to both ends of the exhaust duct DD in the height direction. In addition, the exhaust pipe DP may be connected to a location between both ends of the exhaust duct DD in the height direction. In an implementation, the exhaust duct DD may continuously extend through the upper holder 110a and the lower holder 110b in the height direction, may be connected to the upper exhaust hole DHa and the lower exhaust hole DHb at both ends, respectively, and may be connected to, at the location between both ends in the height direction, the exhaust pipe DP for collecting the exhaust gas discharged from the upper exhaust hole DHa and the lower exhaust hole DHb and discharging the collected exhaust to the outside of the cell holder 110. In this case, the exhaust pipe DP may be connected to the exhaust duct DD at a location between the upper side and the lower side of the cell holder 110 in the height direction, may protrude from the location between the upper side and the lower side of the cell holder 110 toward the outside, and for example, may protrude from an outer surface of the cell holder 110 toward the outside along the direction of the long side line of the cell holder 110. In an implementation, the exhaust pipe DP may be formed at a location between the upper side of the upper holder 110a and the lower side of the lower holder 110b, and may be formed at a location of the upper holder 110a, the location being closer to the upper side of the upper holder 110a than the lower side, or at a location of the lower holder 110b, the location being closer to the lower side of the lower holder 110b than the upper side. In an implementation, the exhaust pipe DP may be protrude from the upper holder 110a toward the outside, and may be formed at a location between the upper side of the upper holder 110a and the lower side of the lower holder 110b, the location being closer to the upper side of the upper holder than the lower side of the lower holder 110b. As illustrated in FIG. 1, according to an embodiment, the circuit board 130 may arranged on the upper holder 110a, the circuit board 130 may be between the upper side of the upper holder 110a and the upper separation member 140a which form the exhaust gas path therebetween, and may generate a flow resistance on the exhaust gas path, and the exhaust pipe DP may be formed at a location between the upper side of the upper holder 110a and the lower side of the lower holder 110b, the location being closer to the upper side of the upper holder 110a than the lower side of the lower holder 110b, to allow the flow resistance to be balanced between the exhaust gas path of the upper holder 110a and the exhaust gas path of the lower holder 110b. As illustrated in FIG. 1, in the case where the circuit board 130 is arranged on the upper holder 110a and the upper exhaust hole DHa is formed at the upper side of the upper holder 110a, the upper exhaust hole DHa may be formed at a location deviated from the circuit board 130, and accordingly, the flow of the exhaust gas introduced into the upper exhaust hole DHa may not be disturbed by the circuit board 130. The circuit board 130 may be arranged on the upper holder 110a and may overlap a partial area of the upper holder 110a rather than the entire area, and thus, the upper exhaust hole DHa may be formed at an area of the upper holder 110a that is not covered by the circuit board 130 to prevent the upper exhaust hole DHa from being blocked by the circuit board 130.

Referring to FIG. 8, the exhaust pipe DP may form an end of the exhaust gas path through which the exhaust gas discharged from the battery cells 10 of the first and second groups accommodated in the cell holder 110 is discharged to the outside of the cell holder 110. Through the present specification, the upper exhaust hole DHa, the lower exhaust hole DHb, and the exhaust duct DD are described as separate components, but this is for convenience of understanding, and both ends of the exhaust duct DD that continuously extends through the upper holder 110a and the lower holder 110b in the height direction may form the upper exhaust hole DHa and the lower exhaust hole DHb, and the upper exhaust hole DHa, the lower exhaust hole DHb, and the exhaust duct DD may be formed together in a single pipe shape that continuously extends in the height direction.

Referring to FIG. 7, the hollow protrusions 115 that form the cooling flow paths F may be formed at the cell holder 110. The hollow protrusion 115 may include a central hollow portion forming the cooling flow path F and a wall body 115a surrounding the central hollow portion. In an implementation, the hollow protrusion 115 may include a circular wall body 115a surrounding the central hollow portion. In an implementation, the circular wall body 115a of the hollow protrusion 115 may refer to a shape of an outer circumference of the hollow protrusion 115, and an inner circumference of the hollow protrusion 115 may have a shape other than a circular shape. In an implementation, the circular wall body 115a of the hollow protrusion 115 may have the outer circumference in a circular shape and the inner circumference in a shape of a triangle with rounded edges. In an implementation, the hollow protrusion 115 may include the wall body 115a that surrounds the central hollow portion and has the outer circumference in any one of various shapes including a polygon, an ellipse, and a hexagon, and the inner circumference in any one of various shapes including a circle, an ellipse, a polygon, and a combination thereof.

The hollow protrusion 115 may protrude from the plate-shaped main body of the cell holder 110, in a direction away from the battery cells 10. In an implementation, the hollow protrusions 115 may extend the cooling flow paths F formed between the adjacent battery cells 10 to the outside of the battery cells 10 in the height direction of the battery cells 10 and may form the cooling flow paths F each surrounded by the wall body 115a. In an implementation, positions of the hollow protrusions 115 formed along the plate-shaped main body of the cell holder 110 may correspond to the positions of the cooling flow paths F formed between the battery cells 10, the positions of the hollow protrusions 115 may correspond to the positions of the cooling flow paths F described with reference to FIG. 4, and the positions of the cooling flow paths F in FIG. 4 may refer to the positions of the hollow protrusions 115.

Referring to FIG. 1, the hollow protrusion 115 may pass through the circuit board 130 and the separation member 140 that are arranged on the upper holder 110a sequentially in the height direction of the battery cells 10, which in case, the hollow protrusion 115 may form the cooling flow path F that extends across the battery pack to pass through substantially the entire battery pack in the height direction of the battery cells 10. In an implementation, the hollow protrusion 115 of the upper holder 110a may pass through the circuit board 130 and the upper separation member 140a that are arranged on the upper holder 110a sequentially in the height direction of the battery cells 10, and the hollow protrusion 115 of the lower holder 110b may pass through the lower separation member 140b that is arranged under the lower holder 110b in the height direction of the battery cells 10. Open regions 135 and 145 into which the hollow protrusions 115 are inserted may be formed at the circuit board 130 and the separation member 140. The open regions 135 and 145 of the circuit board 130 and the separation member 140 may be formed such that positions in the circuit board 130 and the separation member 140 corresponding to the hollow protrusions 115 are opened. The open regions 135 and 145 of the circuit board 130 and the separation member 140 will be described in more detail below.

Referring to FIGS. 1 and 2, the bus bars 120 may be arranged on the cell holder 110. In an implementation, the upper bus bars and the lower bus bars may be arranged on the upper holder 110a and the lower holder 110b, respectively, and the bus bars 120 may be alternately arranged on the upper holder 110a and the lower holder 110b to connect the pair of battery cells 10 adjacent to each other along the electrical connection route. As described above, each of the bus bars 120 may electrically connect the pair of battery cells 10 along the electrical connection route, and the plurality of bus bars 120 may be arranged along the electrical connection route of the battery cells 10 to electrically connect a group of the battery cells 10.

Referring to FIG. 9, the bus bar 120 may include coupling pieces 120a at both ends thereof, a central protruding connection piece 120c that connects the coupling pieces 120a to each other, and bent portions 120b that connect the coupling pieces 120a to the central protruding connection piece 120c in a bent shape. The coupling pieces 120a at both ends of the bus bar 120 may be coupled to the upper end portions 10a or the lower end portions 10b of the pair of adjacent battery cells 10, and may be coupled to the upper end portions 10a or the lower end portions 10b of the pair of adjacent battery cells 10 exposed by the terminal holes 112 of the cell holder 110 to connect the first and second electrodes 11 and 12 of the pair of adjacent battery cells 10 in series or in parallel. In an implementation, the coupling pieces 120a at both ends of the bus bar 120 may be welded to the battery cells adjacent to each other 10.

The bent portions 120b may connect the coupling pieces 120a (at both ends) to the central protruding connection piece 120c in the bent shape, and may help support the protruding connection piece 120c at a level spaced apart from the battery cells 10 in the height direction of the battery cells 10, thereby reducing or preventing electrical interference between the protruding connection piece 120c and the battery cells 10 and pressing the coupling pieces 120a at both ends toward the upper end portions 10a or the lower end portions 10b of the battery cells 10 while being elastically deformed by the protruding connection piece 120c pressed toward the battery cells 10 by the cell holder 110 (e.g., the hollow protrusions 115). This will be described in more detail below.

The protruding connection piece 120c may be a flat plate-shaped member or the bus bar 120 that is farthest from the battery cells 10 in the height direction of the battery cells 10. The protruding connection piece 120c may be on a virtual plane, e.g., of the bus bar 120, that is farthest from the battery cell 10. In an implementation, as illustrated in FIG. 10, the protruding connection piece 120c may be exposed from or through the circuit board 130 on the cell holder 110, e.g., the entire protruding connection piece 120c may be exposed through the circuit board 130 (e.g., in the solid portion of the circuit board 130) through an escape hole 132a in the circuit board 130.

Referring to FIG. 9, the bus bar 120 may extend between the hollow protrusions 115 of the cell holder 110. In an implementation, the bus bar 120 may extend across and between a pair of hollow protrusions 115, e.g., the protruding connection piece 120c of the bus bar 120 may be between the pair of hollow protrusions 115. The extending (e.g., lengthwise) direction of the bus bar 120 and the direction in which the pair of hollow protrusions 115 face each other may cross each other, e.g., may vertically cross each other.

In an implementation, the bus bar 120 may extend across or between a pair of battery cells 10 of which circumferences are adjacent to each other and may electrically connect the pair of adjacent battery cells 10 to each other. In this case, the cooling flow paths F and the hollow protrusions 115 may be between the pair of adjacent battery cells 10 connected to each other by the bus bar 120 and another pair of battery cells 10 adjacent to each other in a direction intersecting the bus bar 120. In an implementation, the bus bar 120 may extend between the pair of hollow protrusions 115 facing each other in the direction intersecting the bus bar 120.

A pair of locking steps 115p (into which the bus bar 120 is inserted to be assembled) may be formed at the pair of hollow protrusions 115 facing each other with the bus bar 120 therebetween, e.g., at the wall bodies 115a of the pair of hollow protrusions 115 facing each other. In an implementation, the locking steps 115p may be on the wall bodies 115a of the hollow protrusions 115, and the bus bar 120, e.g., the protruding connection piece 120c of the bus bar 120, may be inserted into the locking steps 115p (having a wedge shape). The bus bar 120 that is inserted into the locking steps 115p and assembled may be effectively prevented from being separated from the battery cell 10. The pair of locking steps 115p may be formed at the pair of hollow protrusions 115 facing each other with the bus bar 120 therebetween, may extend from the wall bodies 115a of the hollow protrusions 115 to the protruding connection piece 120c of the bus bar 120 to press the protruding connection piece 120c toward the battery cell 10, and the coupling pieces 120a at both ends of the bus bar 120 may be pressed toward the upper end portions 10a or the lower end portions 10b of the battery cells 10 through elastic deformation of the bent portions 120b connected to the protruding connection piece 120c, accordingly the bus bar 120 and the battery cells 10 may be firmly coupled to each other.

Referring to FIG. 9, mold holes 110' may be formed at positions in the cell holder 110 that correspond to the pair of locking steps 115p. In an implementation, the hollow protrusion 115 having the locking step 115p may protrude from the plate-shaped main body of the cell holder 110, and the mold hole 110' may be formed at a position in the main body of the cell holder 110 that corresponds to the locking step 115p, to pass through the main body of the cell holder 110. The mold hole 110' may be formed at a position in which an upper mold and a lower mold are coupled to each other when the cell holder 110 in which the locking steps 115p are formed is molded, and a portion in which a molten resin is not filled due to a coupling mechanism between the upper mold and the lower mold may remain as the mold hole 110'. In an implementation, the cell holder 110 having the locking steps 115p therein may be easily separated from a mold in which the upper mold and the lower mold are combined, and figures or structures of the locking steps 115p of the cell holder 110 may be prevented from being damaged during the separation.

Referring to FIG. 9, the protruding connection piece 120c of the bus bar 120 may include position alignment holes 120g for position alignment with the cell holder 110. In an implementation, position alignment pins 110g (to be inserted into the position alignment holes 120g of the protruding connection piece 120c) may be formed between the pair of hollow protrusions 115. The protruding connection piece 120c having the position alignment holes 120g may be placed on the main body of the cell holder 110 having the pair of hollow protrusions 115. In this case, the position alignment holes 120g of the protruding connection piece 120c may be inserted onto the position alignment pins 110g of the cell holder 110, and accordingly, the bus bar 120 may be assembled in a correct position on the cell holder 110. The pair of position alignment pins 110g may be arranged along a direction in which the bus bar 120 extends. In this case, the direction in which the bus bar 120 extends and the pair of position alignment pins 110g are arranged, may intersect, e.g., may vertically intersect, a direction in which the pair of hollow protrusions 115 having the bus bar 120 interposed therebetween face each other. In an implementation, the position alignment holes 120g and the position alignment pins 110g may be on the bus bar 120 and the cell holder 110 in which the bus bar 120 is assembled, respectively. In an implementation, the position alignment holes 120g and the position alignment pins 110g may be formed on the cell holder 110 and the bus bar 120, respectively, in a manner that the position alignment holes 120g and the position alignment pins 110g are formed at positions corresponding to each other.

Referring to FIGS. 10 and 11, the coupling pieces 120a at both ends of the bus bar 120 may be exposed from or through the circuit board 130 on the bus bars 120, e.g., may be exposed through the circuit board 130 (e.g., the solid portion of the circuit board 130) through or at filling holes FH of the circuit board 130. In an implementation, the filling hole FH may expose at least a portion of the coupling piece 120a of the bus bar 120. In an implementation, the coupling piece 120a of the bus bar 120 coupled to the upper end portion 10a of the battery cell 10 may be exposed through the filling hole FH of the circuit board 130, and potting resin PR filling the filling hole FH may cover and protect a coupling portion or structure between the upper end portion 10a of the battery cell 10 and the coupling piece 120a of the bus bar 120. In an implementation, the potting resin PR may protect the coupling structure between the battery cells 10 and the coupling piece 120a of the bus bars 20 from harmful elements such as oxygen or moisture, and may protect the coupling structure between different heterogeneous materials formed by welding from galvanic corrosion. In an implementation, the filling hole FH may be at or overlie the central portion of the upper end portion 10a of each battery cell 10 to expose the bus bar 120 (e.g., the coupling pieces 120a at both ends of the bus bar 120) coupled to the central portion of the upper end portion 10a of the battery cell 10.

Referring to FIGS. 10 and 12, the circuit board 130 may be on the bus bars 120. The escape holes 132a (exposing portions of the bus bars 120) may be in the circuit board 130. In an implementation, the escape hole 132a may entirely expose the central protruding connection piece 120c of the bus bar 120. In an implementation, the escape hole 132a may entirely expose the protruding connection pieces 120c, and the entire protruding connection piece 120c may be entirely exposed through the circuit board 130 at the escape hole 132a. In an implementation, the protruding connection piece 120c may not overlap the circuit board 130 (e.g., the solid portion of the circuit board 130), e.g., may not overlap the circuit board 130 (e.g., the solid portion of the circuit board 130) at all, even at least partially.

Referring to FIG. 12, the escape hole 132a may accommodate the protruding connection piece 120c, and the protruding connection piece 120c may be at a location between a lower side 130a and a upper side 130b of the circuit board 130 in the height direction (e.g., of the battery cells 10). Here, the lower side 130a of the circuit board 130 may refer to a surface of the circuit board 130 that faces the battery cells 10 and the upper side 130b of the circuit board 130 may refer to a surface opposite to the lower side 130a. In an implementation, the coupling pieces 120a at both ends of the bus bar 120 may overlap (e.g., underlie) the lower side 130a of the circuit board 130 (e.g., the solid portion of the circuit board 130, such that the coupling pieces 120a are between the battery cells 10 and the solid portion of the circuit board 130). In an implementation, the protruding coupling piece 120c (connected to the coupling pieces 120a via the bent portions 120b) may not overlap the lower side 130a of the circuit board 130 (e.g., the solid portion of the circuit board 130), may be accommodated in the escape hole 132a at a location between the lower side 130a and the upper side 130b of the circuit board 130 in the height direction, and thus may not form an additional thickness with respect to a thickness of the circuit board 130 in the height direction. In an implementation, a plane of the protruding coupling piece 120c may be between a plane of the lower side 130a and a plane of the upper side 130b of the circuit board 130 (e.g., in the height direction of the battery cells 10)

The protruding connection piece 120c of the bus bar 120 and the circuit board 130 (e.g., the solid portion of the circuit board 130) may not overlap each other due to the escape holes 132a, the circuit board 130 may be arranged at a low position, e.g., closer to the battery cell 10, a distance q between the circuit board 130 and the battery cell 10 in the height direction may be reduced, and a length of a connection member 125 that forms a voltage measurement line between the circuit board 130 and the battery cell 10 may be reduced. In an implementation, firm junctions may be formed at the circuit board 130 and the battery cell 10 by wire bonding or ribbon bonding that bonds, by ultrasonic welding, one end portion and the other end portion of the connection member 125 to the circuit board 130 and the battery cell 10, respectively, and welding defects of the ultrasonic welding due to relative vibrations between the circuit board 130 and the battery cell 10 may be prevented.

In an implementation, the protruding connection piece 120c of the bus bar 120 and the circuit board 130 (e.g., the solid portion of the circuit board 130) may not overlap each other in the height direction due to the escape holes 132a, the circuit board 130 may be arranged at the low position (close to the battery cell 10), the height of the entire battery pack may be reduced, and a thinner battery pack may be provided.

Referring to FIG. 10, the bus bar 120 may extend between the pair of hollow protrusions 115, and the protruding connection piece 120c of the bus bar 120 may be between the pair of hollow protrusions 115. In an implementation, the escape hole 132a may be at a position in the circuit board 130 corresponding to the protruding connection piece 120c, e.g., at a position between the pair of hollow protrusions 115. The escape hole 132a may be a portion of or continuous with a bus opening region 132b that exposes the pair of hollow protrusions 115 that face each other with the bus bar 120 therebetween and a pair of cooling flow paths F as well as the protruding connection pieces 120c of the bus bar 120. In an implementation, the circuit board 130 may include the bus opening region 132b connected to the escape hole 132a that exposes the protruding connection piece 120c of the bus bar 120, to be formed in a single hole shape, for exposing the hollow protrusions 115 and the protruding connection piece 120c of the bus bar 120 together.

The bus opening region 132b may have the single hole shape in the circuit board 130 to expose a portion of the bus bar 120, e.g., the protruding connection piece 120c of the bus bar 120, together with the pair of hollow protrusions 115 (or the pair of cooling flow paths F) facing each other with the bus bar 120 therebetween. In this case, the escape hole 132a that entirely exposes the protruding connection piece 120c of the bus bar 120 may refer to a region or part of the bus opening region 132b having the single hole shape, excluding a region through which the hollow protrusions 115 pass.

If one hole for exposing the protruding connection piece 120c of the bus bar 120 and two holes for exposing the cooling flow paths F adjacent to each other were to be separately formed with narrow portions therebetween, e.g., if three holes were to be separately formed with narrow portions therebetween, the circuit board 130 could be easily damaged. In an implementation, the protruding connection piece 120c of the bus bar 120 and the pair of cooling flow paths F adjacent to each other may be exposed through the bus opening region 132b having the single hole shape, and accordingly, a structure of the circuit board 130 may be simplified and a risk of damage due to insufficient rigidity of the circuit board 130 may be reduced.

The bus opening region 132b may expose the pair of cooling flow paths F (or the hollow protrusions 115) facing each other with the bus bar 120 therebetween. As will be described below, the bus opening region 132b may have the single hole shape together with a connection opening region 132c that exposes a pair of cooling flow paths F (or the hollow protrusions 115) facing each other with the connection member 125 therebetween, and the bus opening region 132b and the connection opening region 132c may form a second opening region 132 having a single hole shape. In an implementation, the cooling flow paths F (or the hollow protrusions 115) exposed through the second opening region 132 may include the pair of cooling flow paths F (or first and second hollow protrusions 1151 and 1152) facing each other with the bus bar 120 therebetween, and the pair of cooling flow paths F (or the first and third hollow protrusions 1151 and 1153) facing each other with the connection member 125 therebetween, and may include a total of three cooling flow paths F including the cooling flow path F (or the first hollow protrusion 1151) arranged between the bus bar 120 and the connection member 125. In an implementation, the hollow protrusions 115 exposed through the second opening region 132 may include the three hollow protrusions 115 including the first hollow protrusion 1151 between the bus bar 120 and the connection member 125, the second hollow protrusion 1152 facing the first hollow protrusion 1151 with the bus bar 120 therebetween, and the third hollow protrusion 1153 facing the first hollow protrusion 1151 with the connection member 125 therebetween.

In an implementation, the escape hole 132a that exposes the protruding connection piece 120c of the bus bar 120 may be a portion of the second opening region 132, the protruding connection piece 120c of the bus bar 120 may be exposed through the second opening region 132, and the protruding connection pieces 120c may be entirely exposed through the circuit board 130 at the second opening region 132.

Referring to FIG. 10, the circuit board 130 may include the open regions 135 having a hole shape through which the cooling flow paths F (or the hollow protrusion 115) pass. The cooling flow path F may pass through the open region 135 of the circuit board 130 and may extend across the circuit board 130, e.g., the hollow protrusion 115 of the cell holder 110 may be inserted into the open region 135 of the circuit board 130 to form the cooling flow path F that passes through the open region 135 of the circuit board 130. To this end, the open regions 135 of the circuit board 130 may be at positions corresponding to the hollow protrusions 115 of the cell holder 110 and may have a shape corresponding to the hollow protrusion 115 of the cell holder 110. In an implementation, the open region 135 (e.g. a first opening region 131) of the circuit board 130 may have a circular shape corresponding to the hollow protrusion 115 including the circular wall body 115a. In an implementation, the open region 135 (e.g., the first opening region 131) of the circuit board 130 may be formed in various shapes corresponding to the hollow protrusion 115, e.g., in an elliptical shape or a hexagonal shape.

As will be described below, the first opening region 131 of the open region 135 may surround the outer circumference of some of the hollow protrusions 115, and the second opening region 132 may surround at least a portion of the outer circumference of other ones of the hollow protrusions 115. In an implementation, the second opening region 132 may expose two or more hollow protrusions 115 adjacent to each other together, and may surround at least a portion of the outer circumference of each of the two or more hollow protrusions 115 together.

The open region 135 of the circuit board 130 may include the first opening regions 131 each formed for each cooling flow path F (or the hollow protrusion 115) individually and the second opening regions 132 each formed in common for two or more cooling flow paths F adjacent to each other. In an implementation, the second opening region 132 may include the connection opening region 132c and the bus opening region 132b. The connection opening region 132c may be formed in common for the pair of cooling flow paths F facing each other with the connection member 125 therebetween. The connection member 125 will be described in more detail below. The bus opening region 132b may be formed in common for the pair of cooling flow paths F facing each other with the bus bar 120 interposed therebetween. In an implementation, the connection opening region 132c and the bus opening region 132b may not be independent holes separated from each other, and may be rather connected to (e.g., continuous with) each other to form the second opening region 132 in a single hole configuration. The number of cooling flow paths F in the pair of cooling flow paths F exposed through the connection opening region 132c and the pair of cooling flow paths F exposed through the bus opening region 132b may be 3 rather than 4 as one of the cooling flow paths F is included in both pairs. In an implementation, the cooling flow path F at a position where the connection opening region 132c and the bus opening region 132b overlap or meet each other, e.g., the cooling flow path F (or the first hollow protrusion 1151) between the connection member 125 and the bus bar 120 may be included in both the pair of cooling flow paths F (or the first and second hollow protrusions 1151 and 1152) exposed through the bus opening region 132b and the pair of cooling flow paths F (or the first and third hollow protrusions 1151 and 1153) exposed through the connection opening region 132c. In an implementation, the hollow protrusions 115 (or the cooling flow paths F) exposed through the second opening region 132 may include a total of three hollow protrusions 115, e.g., the first hollow protrusion 1151 between the bus bar 120 and the connection member 125, the second hollow protrusion 1152 facing the first hollow protrusion 1151 with the bus bar 120 therebetween, and the third hollow protrusion 1153 facing the first hollow protrusion with the connection member 125 therebetween.

Each of the first opening regions 131 may be a hole formed for each of the cooling flow paths F individually, and may expose the cooling flow path F through the circuit board 130. Unlike the first opening region 131, the second opening region 132 may have a single hole shape in common for two or more cooling flow paths F adjacent to each other, and may expose the two or more neighboring cooling flow paths F together from the circuit board 130.

The connection opening region 132c of the second opening region 132 may expose a portion of the upper end portions 10a of the battery cells 10 together with the pair of cooling flow paths F adjacent to each other (e.g., the pair of cooling flow paths F facing each other with the connection member 125 therebetween). In an implementation, the connection members 125 may be connected to the upper end portions 10a of the battery cells 10 exposed through the connection opening region 132c. In an implementation, the connection opening region 132c may expose a portion of the upper end portions 10a of the battery cells 10 together with the pair of adjacent cooling flow paths F. In the case where the connection opening region 132c exposes the portion of the upper end portions 10a of the battery cells 10, one end of the connection member 125 may be connected to the upper end portion 10a of the battery cell 10 exposed from the circuit board 130 through the connection opening region 132c, and the other end of the connection member 125 may be connected to the circuit board 130, thus the voltage measurement line may be formed between the battery cell 10 and the circuit board 130, and the connection opening region 132c may include a connection hole CH for allowing the connection members 125 to pass through the circuit board 130 and be connected. The connection hole CH will be described in more detail below.

Referring to FIG. 10, according to an embodiment, the connection opening region 132c of the second opening region 132 may expose portions of the upper end portions 10a of the battery cells 10 together with the pair of cooling flow paths F adjacent to each other (e.g., the pair of cooling flow paths F facing each other with the connection member 125), and may function as the connection hole CH. In an implementation, the connection opening region 132c and the connection hole CH may have substantially the same configuration, e.g., the same hole formed in the circuit board 130. In the present specification, for convenience of understanding, the connection opening region 132c and the connection hole CH will be assigned different reference numerals.

Portions of the upper end portions 10a of the battery cells 10 may be exposed through the connection hole CH (or the connection opening region 132c), and the connection member 125 may be connected to the upper end portion 10a of the battery cell 10 exposed through the circuit board 130. In an implementation, the connection member 125 may include a conductive wire or a conductive ribbon having one end connected to the upper end portion 10a of the battery cell 10 and the other end connected to the circuit board 130, and the connection member 125 may be formed by wire bonding that bonds the one end and the other end of the conductive wire to the upper end portion 10a of the battery cell 10 and the circuit board 130, respectively, or ribbon bonding that bonds the one end and the other end of the conductive ribbon to the upper end portion 10a of the battery cell 10 and the circuit board 130, respectively. In this case, in the wire bonding or the ribbon bonding, the conductive wire or the conductive ribbon may be bonded to the upper end portion 10a of the battery cell 10 and the circuit board 130 by ultrasonic welding.

In an implementation, the connection member 125 may be a pair of conductive wires that extend in parallel to connect the battery cell 10 to the circuit board 130, and may firmly connect the battery cell 10 to the circuit board 130 by preparing for a situation where one of the conductive wires is disconnected due to insufficient mechanical strength. In the case where the connection member 125 is the conductive ribbon that has a mechanical strength greater than that of the conductive wire, the battery cell 10 and the circuit board 130 may be electrically connected to each other through a single conductive ribbon. For reference, the connection member 125 exemplarily illustrated in FIG. 10 may be the conductive ribbon.

The connection hole CH may be formed in a region of the circuit board 130 that overlaps the pair of battery cells 10 adjacent to each other to expose the upper end portions 10a of the pair of adjacent battery cells 10 together. In an implementation, the connection hole CH may be formed in a region of the circuit board 130 that overlaps a portion of the pair of adjacent battery cells 10, e.g., may be formed in a region that overlaps edge portions of the pair of battery cells 10. In addition, two connection members 125 may be connected to the edge portions of the pair of battery cells 10 adjacent to each other exposed through the connection hole CH.

The edge portions of the upper end portions 10a of the pair of battery cells 10 exposed through the connection hole CH may form the first electrodes 11 having the same polarity. In an implementation, the pair of adjacent battery cells 10 exposed by the same connection hole CH may be arranged in a pattern in which one of the pair of adjacent battery cells 10 is inverted in the height direction of the battery cells 10, however, the edge portions of the upper end portions 10a of the pair of adjacent battery cells 10 may form the first electrodes 11 having the same polarity regardless of the vertical arrangement of the battery cells 10. As illustrated in FIG. 3, the can N forming the first electrode 11 may extend from the edge portion of the upper end portion 10a to the entire lower end portion 10b, thus, regardless of the vertical arrangement of the battery cells 10, both the edge portions of the upper end portions 10a and the edge portions of the lower end portions 10b of the adjacent battery cells 10 may form the first electrodes 11 having the same polarity.

As described above, the connection members 125 may be connected to the edge portions of the upper end portions 10a of the battery cells 10 exposed through the connection hole CH and may be connected to the first electrodes 11 of the battery cells 10. Referring to FIG. 2, most of a plurality of connection members 125 may be connected to the first electrodes 11 of the battery cells 10 exposed through the connection holes CH, some of the connection members 125 may be connected to the first and second output terminals 121 and 122 or to the battery cells 10 connected to the first and second output terminals 121 and 122, and thus may be connected to the second electrodes 12 of the battery cells 10. In an implementation, the first and second output terminals 121 and 122 may be connected to the low-potential battery cell 10 having the lowest potential and the high-potential battery cell 10 having the highest potential, respectively, in a group of the battery cells 10 electrically connected to each other. In this case, one connection member 125a may be connected to the first electrode 11 at the upper end portion 10a of the low-potential battery cell 10, and the other connection member 125b may be connected to the second electrode 12 at the upper end portion 10a of the high-potential battery cell 10. In an implementation, among a group of the connection members 125 that constitutes the battery pack, the one connection member 125a may be connected to the first electrode 11 in the low-potential battery cell 10 connected to the first output terminal 121, while the other connection member 125b may be connected to the second electrode 12 in the high-potential battery cell 10 connected to the second output terminal 122, and the remaining connection members 125 may be connected to the first electrodes 11 at the edge portions of the upper end portions 10a of the battery cells 10 having middle potentials other than the low-potential battery cell 10 and the high-potential battery cell 10. In an implementation, the connection members 125 may be connected to the second electrode 12 only for the high-potential battery cell 10 connected to the second output terminal 122, and may be connected to the first electrodes 11 for the remaining battery cells 10.

Referring to FIG. 10, the connection opening region 132c (or the connection hole CH) may have a sufficient area to expose the pair of cooling flow paths F adjacent to each other (e.g., the pair of cooling flow paths F facing each other with the connection member 125 therebetween), together with the edge portions of the pair of battery cells adjacent to each other 10. In an implementation, a direction in which the pair of battery cells 10 exposed through the connection opening region 132c face each other and a direction in which the pair of cooling flow paths F (e.g., the pair of cooling flow paths F facing each other with the connection member 125 therebetween) exposed through the connection opening region 132c may intersect each other, e.g., may vertically intersect each other.

If one connection hole CH for exposing the edge portions of the pair of battery cells 10 adjacent to each other and two open regions 135 for exposing the cooling flow paths F adjacent to each other were to be separately formed with narrow portions therebetween, e.g., if three holes were separately formed with narrow portions therebetween, the circuit board 130 could be easily damaged. In an implementation, the connection hole CH or the connection opening region 132c having a single hole shape may expose the edge portions of the pair of battery cells 10 adjacent to each other and the pair of cooling flow paths F adjacent to each other, and accordingly, the structure of the circuit board 130 may be simplified and a risk of damage due to insufficient rigidity of the circuit board 130 may be reduced.

The connections members 125 may be between the circuit board 130 and the upper end portions 10a of the battery cells 10 exposed through the connection opening region 132c or the connection hole CH, to electrically connect the circuit board 130 to the upper end portions 10a of the battery cells 10, and the connection member 125 may transmit voltage information of the battery cell 10 to the circuit board 130. In an implementation, the connection member 125 may electrically connect the upper end portion 10a of the battery cell 10 to a connection pad 133 of the circuit board 130. The connection pads 133 of the circuit board 130 may be formed around the connection hole CH, e.g., a pair of connection pads 133 each electrically connected to each of the pair of adjacent battery cells 10 may be formed at positions facing each other around the connection hole CH.

In an implementation, the connection opening region 132c may form the second opening region 132 together with the bus opening region 132b that exposes the pair of cooling flow paths F facing each other with the bus bar 120 therebetween. In this case, the second opening region 132 may have a single hole shape, and may extend along an outer circumferential direction surrounding the filling hole FH. The second opening region 132 may include the cooling flow path F (or the first hollow protrusion 1151) between the bus bar 120 and the connection member 125, another cooling flow path F (or the second hollow protrusion 1152) arranged with the cooling flow path F (or the first hollow protrusion 1151) with the bus bar 120 therebetween, and yet another cooling flow path F (or the third hollow protrusion 1153) arranged with the cooling flow path F (or the first hollow protrusion 1151) and the connection member 125 therebetween, and may expose together the three different cooling flow paths F continuously arranged along the outer circumferential direction surrounding the filling hole FH. In an implementation, as illustrated in FIG. 4, six cooling flow paths F may be formed along the outer circumferential direction of one battery cell 10, and three adjacent cooling flow paths F among the six cooling flow paths F may be exposed through the second opening region 132.

Referring to FIG. 10, the second opening region 132 may include the first hollow protrusion 1151 between the bus bar 120 and the connection member 125, the second hollow protrusion 1152 facing the first hollow protrusion 1151 with the bus bar 120 therebetween, and the third hollow protrusion 1153 facing the first hollow protrusion 1151 with the connection member 125 therebetween, and overall may expose three different hollow protrusions 115 continuously arranged along the outer circumferential direction surrounding the filling hole FH.

Referring to FIG. 10, a thermistor TH for measuring a temperature of the battery cell 10 may be arranged at the upper end portion 10a of the battery cell 10, e.g., the thermistor TH may be arranged at the edge portion of the battery cell 10. In an implementation, the thermistor TH may be at a portion of the edge portion of the battery cell 10 that is spaced apart from, in the outer circumferential direction of the battery cell 10, the portion of the edge portion of the battery cell 10 to which the connection member 125 is connected. In an implementation, the connection member 125 and the thermistor TH may be arranged at positions spaced apart from each other along the edge portion of the battery cell 10 to avoid interference with each other. In an implementation, the thermistor TH may be a chip-type thermistor TH that may be directly bonded to the edge portion of the battery cell 10. In addition, the thermistor TH may be bonded to the edge portion of the battery cell 10 by solder mounting.

In the cell holder 110 in which the battery cells 10 are assembled, a long hole may be formed to expose the edge portions of the battery cells 10 while extending in the outer circumferential direction of the battery cells 10, and the connection members 125 and the thermistors TH may be arranged at positions spaced apart from each other in the edge portions of the battery cells 10 while the edge portions of the battery cells 10 is exposed through the long hole formed in the cell holder 110. As illustrated in FIG. 11, the adhesive resin AR may be formed on the connection member 125 bonded to the edge portion of the battery cell 10, and the adhesive resin AR may not extend to the position of the thermistor TH and may not be formed on the thermistor TH.

Referring to FIG. 13, the connection hole CH may be formed in an alternate pattern along the column direction (e.g., L1 and L2) of the battery cells 10 (or the filling hole FH) to expose the pair of battery cells 10 adjacent to each other along the column direction (for example, L1 and L2) of the battery cells 10 (or the filling hole FH). In an implementation, the first and second opening regions 131 and 132 for exposing the cooling flow paths F may formed at the circuit board 130, and the connection opening region 132c (or the second opening region 132) that functions as the connection hole CH and the first opening region 131 that does not function as the connection hole CH may be arranged in an alternate pattern along the column direction (e.g., L1 and L2) of the battery cells 10 (or the filling hole FH). In an implementation, one connection opening region 132c (or the second opening region 132) that functions as the connection hole CH may be formed between two battery cells 10 (or the filling holes FH) that are paired with each other along the column direction (e.g., L1 and L2), and the connection opening region 132c (or the second opening region 132) that functions as the connection hole CH may not be formed between two battery cells 10 (or the filling holes FH) that are not paired with each other. In other words, the connection opening region 132c (or the second opening regions 132) may not be formed between every two battery cells 10 (or the filling holes FH) adjacent to each other along the column direction (e.g., L1 or L2) of the battery cell 10 or the filling hole FH, but may be formed alternatively between two battery cells 10 (or the filling holes FH) adjacent to each other along the column direction (e.g., L1 or L2) of the battery cell 10 (or the filling hole FH). In this case, the first opening region 131 for exposing the cooling flow path F passing between the adjacent battery cells 10 may be formed at a position P, between the adjacent battery cells 10 or between the adjacent filling holes FH, where the connection opening region 132 (or the second opening region 132) is not formed or a position adjacent thereto.

As will be described below, the filling hole FH may be formed at a position overlying the central position of the upper end portion 10*a* of the battery cell 10, and in the case where the first and second opening regions 131 and 132 may be arranged between the adjacent battery cells 10 in an alternating pattern along the column direction Z1 of the battery cell 10, the first and second opening regions 131 and 132 may be arranged between the adjacent filling holes FH in the alternating pattern along the column direction (e.g., L1 and L2) of the filling holes FH, and may be arranged at positions adjacent to the position P between the adjacent filling holes FH in the alternating pattern. In an implementation, the first opening region 131 may be formed at a position adjacent to the position P between the adjacent filling holes FH rather than between the adjacent filling holes FH in the column direction (e.g., L1 and L2) of the filling holes FH, and even in this case, the first open region 131 may still be arranged between the adjacent battery cells 10. This is because the filling hole FH is formed at the central portion of the adjacent battery cell 10.

As described above with reference to FIG. 4, six cooling flow paths F may be formed along the circumferential direction of one battery cell 10. In this case, four cooling flow paths F may be formed at both sides of one battery cell 10 in the column direction Z1 of the battery cells 10, and at least one cooling flow path F of two adjacent cooling flow paths F formed at one side of the battery cell 10 may be exposed by the first opening region 131 formed in each cooling flow path F, and two adjacent cooling flow paths F formed at the other side of the battery cell 10 may be exposed by the connection opening region 132*c* or the second opening region 132 formed in common with respect to the two cooling flow paths F. As described above, with respect to one battery cell 10, the first opening region 131 may be formed at one side, the connection opening region 132*c* (or the second opening region 132) may be formed at the other side, and the first and second opening regions 131 and 132 may be arranged in an alternating pattern along the column directions (for example, L1 and L2) of the battery cell 10 (or the filling hole FH). In an implementation, the connection opening region 132*c* (or the second opening region 132) that functions as the connection hole CH and the first opening region 131 that does not function as the connection hole CH are arranged in an alternate pattern along the column direction (e.g., L1 and L2) of the battery cells 10 (or the filling hole FH).

Referring to FIG. 13, the second opening regions 132 that extend along the outer circumferential direction of the filling holes FH of the adjacent rows (e.g., L1 and L2) may be formed in different shapes, e.g., the second opening region 132 that extends along the outer circumferential direction of the filling hole FH of the first row L1 may extend along the outer circumferential direction of the filling holes FH in a downward direction from the connection member 125 toward the filling holes FH of the second row L2. In an implementation, the second opening region 132 that extends along the outer circumferential direction of the filling hole FH of the second row L2 may extend from the connection member 125 toward the filling hole FH of the first row L1 along the outer circumferential direction of the filling hole FH in the upper direction. As described above, the second opening regions 132 that extends along the outer circumferential direction of the filling hole FH in the first and second rows L1 and L2 adjacent to each other may be formed to have different extension directions from each other, and thus, the second opening regions 132 having the different extension directions from each other may be densely arranged in a narrow space between the filling holes FH in the first and second rows L1 and L2 while avoiding interference between each other. In an implementation, the second opening region 132 may extend along the outer circumferential direction of the filling hole FH. In an implementation, the filling hole FH may be omitted and in this case, the second opening region 132 may be understood as extending along the outer circumferential direction of the central portion of the upper end portion 10*a* of the battery cell 10. This is because the filling hole FH may be formed at the central portion of the upper end portion 10*a* of each battery cell 10 to expose the bus bar 120 coupled to the central portion of the upper end portion 10*a* of the battery cell 10.

In an implementation, referring to FIG. 1, the circuit board 130 may be on the upper holder 110*a* and may not be arranged under the lower holder 110*b*. In an implementation, the circuit board 130 may be selectively arranged on any one of the upper holder 110*a* and the lower holder 110*b*, e.g., the circuit board 130 may be arranged on the upper holder 110*a* and may collect voltage information of the plurality of battery cells 10 through the upper end portions 10*a* of the battery cells 10. In an implementation, the circuit board 130 may collect the voltage information of the plurality of battery cells 10 through the upper end portions 10*a* or the lower end portions 10*b* of the plurality of battery cells 10, and for example, the circuit board 130 may collect the voltage information of the plurality of battery cells 10 through the upper end portions 10*a* of the plurality of battery cells 10. In an implementation, the battery cell 10 may include the first and second electrodes 11 and 12 that are formed at the upper end portion 10*a* and the lower end portion 10*b*, the circuit board 130 may not need to be connected to both of the upper end portion 10*a* and the lower end portion 10*b* of the battery cell 10 to obtain the voltage information of the battery cell 10, the voltage information of the plurality of battery cells 10 may be obtained through the upper end portions 10*a* or the lower end portions 10*b* of the battery cells 10, e.g., the upper end portions 10*a* of the battery cells 10, and the voltage information of the battery cells 10 may be collected through the circuit board 130 that is selectively arranged on the upper end portions 10*a* of the battery cells 10, thus the structure of the entire battery pack may be simplified. In an implementation, the electrical connection of the battery cell 10 may be performed through both of the upper end portion 10*a* and the lower end portion 10*b* of the battery cell 10, and the voltage measurement of the battery cell 10 may be performed through any one of the upper end portion 10*a* of the battery cell 10 selectively, for example, through the upper end portion 10*a* of the battery cell 10.

If the voltage measurement were to be performed on both of the upper end portion 10*a* and the lower end portion 10*b* of the battery cell 10, the circuit board 130 may need to be arranged on both of the upper end portion 10*a* and the lower end portion 10*b* of the battery cell 10, and accordingly, the overall structure of the battery pack may be complicated, and a separate wiring structure for connecting the circuit boards 130 on both sides may be required to collect the voltage information measured from the circuit boards 130 on both sides.

Referring to FIGS. 9 and 11, according to an embodiment, the potting resin PR may be formed at a position corresponding to the central portion of the upper end portion 10*a* or the lower end portion 10*b* of the battery cell 10, and the adhesive resin AR may be formed at a position corresponding to the edge portion surrounding the central portion of the upper end portion 10*a* or the lower end portion 10*b* of the battery cell 10. In this case, the potting resin PR and the adhesive resin AR may include different components.

In an implementation, the bus bar 120 that electrically connects the adjacent battery cells 10 to each other may connect the central portions of the upper end portions 10*a* of the adjacent battery cells 10 to each other. In this case, the potting resin PR may be formed on the coupling portions between the central portions of the upper end portions 10*a* of the battery cells 10 and the coupling pieces 120*a* at both ends of the bus bar 120, and according to an embodiment, the potting resin PR may be injected onto the coupling pieces 120*a* at both ends of the bus bar 120 through the filling hole FH of the circuit board 130.

The potting resin PR may help protect the coupling structure between the battery cells 10 and the coupling pieces 120*a* of the bus bar 120 from harmful elements such as oxygen or moisture, and may help protect the coupling structure between different heterogeneous materials formed by welding, e.g., the heterogeneous materials formed between the upper end portion 10*a* of the battery cells 10 and the coupling piece 120*a* of the bus bar 120 from galvanic corrosion.

The potting resin PR may be filled in the filling hole FH of the circuit board 130 on the bus bars 120, and the filling holes FH of the circuit board 130 may expose the coupling pieces 120*a* at both ends of the bus bar 120 connected to the battery cells 10, respectively. In an implementation, the filling hole FH may be formed for each of the battery cells 10, two filling holes FH may be formed for each of the bus bars 120 that connects two adjacent battery cells 10 to each other, e.g., one filling hole FH may be formed for each of the coupling pieces 120*a* at both ends of the bus bar 120, the potting resin PR may be filled in each of the filling holes FH, and thus the potting resin PR filled in the filling holes FH may cover the coupling portions between the battery cells 10 and the coupling pieces 120*a* formed at both ends of the bus bars 120 (e.g., the coupling pieces 120*a* formed at both ends of the bus bar 120). For example, the potting resin PR being filling the filling holes FH of the circuit board 130 may be injected onto the coupling pieces 120*a* of the bus bars 120 interposed between the circuit board 130 and the battery cells 10.

In an implementation, the bus bar 120 may include the central protruding connection piece 120*c* that connects the coupling pieces 120*a* at both ends to each other, and the bent portions 120*b* that connect the coupling pieces 120*a* at both ends to the central protruding connection piece 120*c* in a bent shape and support the protruding connection piece 120*c* at a level spaced apart from the battery cells 10 from the coupling pieces 120*a* at both ends in the height direction of the battery cells 10. In this case, the circuit board 130 arranged on the bus bar 120 may have the escape hole 132*a* for completely exposing the entire protruding connection piece 120*c*. As illustrated in FIG. 12, the protruding connection piece 120*c* of the bus bar 120 and the circuit board 130 (the solid portion of the circuit board 130) may be arranged so as not to overlap each other in the height direction through the escape hole 132*a* formed in the circuit board 130, thus the circuit board 130 may be arranged at a position close to the coupling pieces 120*a* of the bus bar 120, and the gap q between the circuit board 130 and the coupling piece 120*a* of the bus bar 120 in the height direction may be reduced, such that the amount of the potting resin PR injected onto the coupling pieces 120*a* of the bus bars 120 through the filling holes FH of the circuit board 130 may be reduced, and the contamination of the surroundings due to the movement of the surplus or uncontrollable potting resin PR may be prevented.

The potting resin PR may be injected onto the coupling pieces 120*a* at both ends of the bus bar 120 based on proper fluidity when uncured, e.g., may be injected through the filling hole FH of the circuit board 130, may be cured, after injection, by irradiating UV light, heating, or curing in a timely manner, and then may protect the coupling portions between the bus bars 120 and the battery cells 10 from external harmful elements such as oxygen or moisture. In addition, the potting resin PR may insulate the upper end portion 10*a* of the battery cell 10 exposed through the filling hole FH of the circuit board 130, from the bus bar 120. In an implementation, the PR may include a urethane resin such as polyurethane.

In an implementation, as illustrated in FIG. 11, the potting resin PR may be on the coupling structures between the upper end portions 10*a* of the battery cells 10 and the bus bars 120, or the potting resin PR may also be formed on the coupling structures between the lower end portions 10*b* of the battery cells 10 and the bus bars 120. In an implementation, the circuit board 130 may be selectively formed only on the upper end portion 10*a* of the battery cell 10 (i.e., the circuit board 130 may be selectively arranged only on the upper holder 110*a*), and in this case, the coupling portion between the lower end portion 10*b* of the battery cell 10 and the bus bar 120 may be formed directly on the coupling portion between the lower end portion 10*b* of the battery cell 10 and the bus bar 120 without the filling hole FH of the circuit board 130.

Throughout the present specification, in the case where the potting resin PR is formed at a position corresponding to the central portion of the upper end portion 10*a* or the lower end portion 10*b* of the battery cell 10 in the height direction of the battery cell 10, the potting resin PR may be formed on the coupling structure between the battery cell 10 and the bus bar 120 to cover the coupling portion, and the potting resin PR may be filled in the filling hole FH of the circuit board 130 formed on the bus bar 120.

In the case where the potting resin PR is formed on the central portion of the upper end portion 10*a* or the lower end portion 10*b* of the battery cell 10, the potting resin PR may be formed at the central portion of the upper end portion 10*a* or the lower end portion 10*b* of the battery cell 10, to which the coupling pieces 120*a* at both ends of the bus bar 120 are coupled. Here, the central portion of the upper end portion 10*a* or the lower end portion 10*b* of the battery cell 10 refers to a position to which the coupling pieces 120*a* at both ends of the bus bar 120 are coupled, e.g., the upper end portion 10*a* or the lower end portion 10*b* of the battery cell 10, and the central position of the upper end portion 10*a* or the lower end portion 10*b* of the battery cell 10 is not limited thereto. In an implementation, in relation to the position where the potting resin PR is formed, the central portion of the upper end portion 10*a* or the lower end portion 10*b* of the battery cell 10 may refer to an inner area of the upper end portion 10*a* or the lower end portion 10*b* of the battery cell 10, other than the edge portion, e.g., an inner area surrounded by the edge portion, to distinguish a position where any one of the first and second electrodes 11 and 12 of the battery cell 10 is formed from a position where another electrode is formed, along the upper end portion 10a or the lower end portion 10b of the battery cell 10, and in relation to the position where the potting resin PR is formed, the central portion of the upper end portion 10a or the lower end portion 10b of the battery cell 10 may refer to an inner area of the upper end portion 10a or the lower end portion 10b of the battery cell 10, based on the boundary between the one electrode and another of the battery cell 10. As described above with reference to FIG. 3, the second electrode 12 of the battery cell 10 may be formed at the central portion of the upper end portion 10a of the battery cell 10, and the first electrode 11 may be formed at the edge portion of the upper end portion 10a. In this case, in relation to the positions to which the coupling pieces 120a at both ends of the bus bar 120 are coupled, the central portion of the upper end portion 10a of the battery cell 10 may refer to the second electrode 12 formed at the central portion of the upper end portion 10a of the battery cell 10.

Referring to FIGS. 9 and 10, the upper end portion 10a of the battery cell 10 may be exposed through the terminal hole 112 of the upper holder 110a in which the battery cells 10 are assembled, and the upper end portion 10a of the battery cell 10 exposed through the terminal hole 112 of the upper holder 110a may be coupled to the bus bar 120 on the upper holder 110a. In this case, the terminal hole 112 of the upper holder 110a and the filling hole FH of the circuit board 130 may be formed at positions corresponding to (e.g., aligned with or overlying) each other in the height direction of the battery cells 10. The terminal hole 112 of the upper holder 110a is to expose the upper end portion 10a of the battery cell 10, the filling hole FH of the circuit board 130 is to expose the coupling piece 120a of the bus bar 120 coupled to the upper end portion 10a of the battery cell 10, and thus the terminal hole 112 of the upper holder 110a and the filling hole FH of the circuit board 130 may be aligned at positions corresponding to each other in the height direction of the battery cell 10. In an implementation, in the case where the circuit board 130 is arranged under the lower holder 110b, the terminal hole 112 of the lower holder 110b and the filling hole FH of the circuit board 130 may be aligned at positions corresponding to each other.

Referring to FIGS. 10 and 11, according to an embodiment, the connection member 125 forming the voltage measurement line between the battery cell 10 and the circuit board 130 may be coupled to the edge portion of the upper end portion 10a of the battery cell 10. Here, the edge portion of the upper end portion 10a of the battery cell 10 may refer to the portion surrounding the central portion of the upper end portion 10a. The connection member 125 may pass through the connection hole CH of the circuit board 130 to electrically connect the battery cell 10 to the circuit board 130, and one end of the connection member 125 may form a junction with the edge portion of the battery cell 10 and the other end of the connection member 125 may form a junction with the circuit board 130. In this case, the adhesive resin AR may cover the junctions of one end and the other end of the connection member 125, e.g., the adhesive resin AR may continuously cover the junctions of one end and the other end of the connection member 125 together. Here, the adhesive resin AR may entirely cover the connection member 125. The adhesive resin AR may cover the edge portion of the upper end portion 10a of the battery cell 10 and the junctions of the connection member 125 formed on the circuit board 130 to protect the junctions from an external impact, and the adhesive resin AR may entirely cover the connection member 125 to prevent the connection member 125 formed of the conductive wire or the conductive ribbon from being disconnected due to an insufficient mechanical strength.

The adhesive resin AR may cover two connection members 125 bonded to the edge portions of two adjacent battery cells 10 exposed through the connection hole CH. In an implementation, the adhesive resin AR may cover one ends and other ends of the two connection members 125 respectively bonded to the two battery cells 10 exposed through the connection hole CH, and may continuously cover the one ends and the other ends of the two connection members 125. In this case, the adhesive resin AR may entirely cover the two connection members 125 bonded to the two battery cells 10 exposed through the connection hole CH. The adhesive resin AR may continuously cover the upper end portions 10a of the two battery cells 10 exposed through the connection hole CH while entirely covering the two connection members 125, and may electrically insulate the upper end portions 10a of the two battery cells 10 exposed through the connection hole CH. For example, the adhesive resin AR may cover the upper end portions 10a of the two battery cells 10 exposed through the connection hole CH together with the connection members 125, thereby electrically insulating the two connection members 125 and the upper end portions 10a of the two battery cells 10.

The connection member 125 may be supported while being suspended between the one end bonded to the edge portion of the upper end portion 10a of the battery cell 10 and the other end bonded to the circuit board 130, the adhesive resin AR may be continuously formed to entirely cover the connection member 125 together with the bonding portions formed at the one end and the other end of the connection member 125, and accordingly, the connection member 125 may be stably supported without moving by an external impact.

The adhesive resin AR may include a two-component curable resin including different components. In an implementation, the adhesive resin AR may include an epoxy adhesive, and may include a two-component curable resin including epoxy as a main material and amine as a curing agent. In an implementation, the adhesive resin AR may be applied on the connection member 125 and then cured by heating or curing in a timely manner, and according to an embodiment, the adhesive resin AR may be cured by irradiating UV light. The cured adhesive resin AR may firmly support the entire connection member 125, including the one end and the other end thereof. The adhesive resin AR may be applied on the connection member 125 based on proper fluidity when uncured, for example, may be injected through the connection hole CH, may be cured by, after injection, irradiating UV light, heating, or curing in a timely manner, and then may firmly support the connection member 125.

Referring to FIGS. 10 and 11, the adhesive resin AR may cover the edge portions of the upper end portions 10a of the adjacent battery cells 10 exposed through the connection hole CH. In this case, the connection hole CH may expose the hollow protrusions 115 connected to the cooling flow paths F formed around the battery cell 10 covered with the adhesive resin AR. In an implementation, the connection hole CH may expose a pair of hollow protrusions 115 facing each other with the connection members 125 therebetween, and in this case, the pair of hollow protrusions 115 may be formed between the pair of battery cells 10 exposed through the connection hole CH.

Throughout the present specification, in the case where the adhesive resin AR is formed at a position corresponding to the edge portion of the upper end portion 10a or the lower end portion 10b of the battery cell 10 in the height direction of the battery cell 10, the adhesive resin AR may be formed on the edge portion of the battery cell 10 to cover the junctions of the connection members 125, and the adhesive resin AR may be filled in the connection holes CH of the circuit board 130 formed on the upper portion of the battery cells 10.

In the present disclosure, in relation to the edge portion of the upper end portion 10a of the battery cell 10 at which the adhesive resin AR is formed, the adhesive resin AR may be formed at the edge portion of the upper end portion 10a of the battery cell 10 to which the connection member 125 is coupled. In this case, the edge portion of the upper end portion 10a of the battery cell 10 refers to a position of the upper end portion 10a of the battery cell 10 to which the connection member 125 is coupled, and the edge position of the upper end portion 10a of the battery cell 10 is not limited. In an implementation, in relation to the position where the adhesive resin AR is formed, the edge portion of the upper end portion 10a of the battery cell 10 may refer to an outer area of the upper end portion 10a of the battery cell 10, other than the central portion, that is, an outer area surrounding the central portion, to distinguish a position where any one of the first and second electrodes 11 and 12 of the battery cell 10 is formed from a position where another electrode is formed, along the upper end portion 10a of the battery cell 10, and in relation to the position where the adhesive resin AR is formed, the edge portion of the upper end portion 10a of the battery cell 10 may refer to an outer area of the upper end portion 10a of the battery cell 10, based on the boundary between the one electrode and another of the battery cell 10.

As described above with reference to FIG. 3, the second electrode 12 of the battery cell 10 may be formed at the central portion of the upper end portion 10a of the battery cell 10, and the first electrode 11 may be formed at the edge portion of the upper end portion 10a and the lower end portion 10b. In this case, in relation to the position to which the connection member 125 is coupled, the edge portion of the upper end portion 10a of the battery cell 10 may refer to the first electrode 11 formed at the edge portion of the upper end portion 10a of the battery cell 10.

FIG. 11 illustrates the adhesive resin AR formed on the connection members 125 that connect the upper end portions 10a of the battery cells 10 to the circuit board 130. In an implementation, the circuit board 130 may be selectively formed on the upper end portion 10a of the battery cell 10 (i.e., the circuit board 130 is selectively arranged only on the upper holder 110a), and according to another embodiment, the circuit board 130 may be formed under the lower end portions 10b of the battery cells 10, and in this case, the adhesive resin AR may be formed on the connection members 125 that connect the lower end portions 10b of the battery cells 10 to the circuit board 130.

The potting resin PR and the adhesive resin AR contribute to different purposes, and they may include different components having different material characteristics. In an implementation, the potting resin PR may have a function of protecting the coupling portions of the bus bars 120 from harmful elements such as oxygen or moisture, and thus, may have airtightness to prevent penetration of the harmful elements. In an implementation, the adhesive resin AR may have adhesion to be firmly attached to the connection members 125 thereby protecting the connection member 125 such as a conductive wire or a conductive ribbon from an external impact.

Referring to FIGS. 14 to 16, the separation member 140 may be arranged on the cell holder 110. The separation member 140 may spatially separate the cooling flow paths F for the cooling medium CM for cooling the battery cells 10, from the exhaust gas path for the exhaust gas DG discharged from the vent portions 13 of the battery cells 10. In an implementation, the separation member 140 spatially separates the cooling flow paths F from the exhaust gas path, thereby removing a risk of explosion or fire due to mixing of the high-temperature and high-pressure exhaust gas DG flowing through the exhaust gas path and the cooling medium CM such as air flowing through the cooling flow paths F. In an implementation, in the battery pack mounted on an electric vehicle, the exhaust gas (DG) may be prevented from flowing into the interior of the vehicle along an uncontrolled path.

Referring to FIG. 1, the separation member 140 may include an upper separation member 140a arranged on the upper holder 110a and a lower separation member 140b arranged under the lower holder 110b. In an implementation, the upper separation member 140a may be arranged on the circuit board 130 arranged on the upper holder 110a. In an implementation, the circuit board 130 may not be arranged under the lower holder 110b, and thus the lower separation member 140b may be arranged directly under the lower holder 110b. For example, the lower separation member 140b may be arranged under the lower bus bars arranged under the lower holder 110b.

Referring to FIG. 14, open regions 145 through which the cooling flow paths F passes may be formed in the separation member 140. The cooling flow path F may be formed across the separation member 140 while passing through the open region 145 of the separation member 140, e.g., the hollow protrusion 115 of the cell holder 110 may be inserted into the open region 145 of the separation member 140, and thus the cooling flow path F that passes through the open region 145 of the separation member 140 may be formed. To this end, the open regions 145 of the separation member 140 may be formed at positions corresponding to the hollow protrusions 115 and may be formed in a shape corresponding to the hollow protrusions 115. In an implementation, the open region 145 may be formed in a circular shape corresponding to the hollow protrusion 115 including the circular wall body 115a that surrounds the central hollow portion. In an implementation, the open region 145 may be formed in various shapes corresponding to the hollow protrusion 115, for example, an elliptical shape or various polygonal shapes including a hexagon.

Referring to FIG. 15, according to an embodiment, the open region 145 may include a wall body 145a that extends toward the hollow protrusion 115, and the wall body 115a of the hollow protrusion 115 may be inserted into the wall body 145a of the open region 145. In this case, the wall body 145a of the open region 145 and the wall body 115a of the hollow protrusion 115 may be formed in circular shapes corresponding to each other at positions corresponding to each other, and may be assembled by being press-fit toward each other. In an implementation, the outer circumference of the wall body 115a of the hollow protrusion 115 may be inserted into the inner circumference of the wall body 145a in the open region 145, and the wall body 115a of the hollow protrusion 115 and the wall body 145a in the open region 145 may be assembled by being press-fit toward each other. In an implementation, the wall body 145a of the open region 145 may have an inner circumference having a size that decreases gradually toward the hollow protrusion 115, or the wall body 115a of the hollow protrusion 115 may have an outer circumference having a size that increases gradually toward the open region 145, and the wall body 145*a* of the open region 145 or the wall body 115*a* of the hollow protrusion 115 may have a gradient along the direction of protruding toward each other such that the wall body 145*a* of the open region 145 and the wall body 115*a* of the hollow protrusion 115 may be press-fit toward each other.

The separation member 140 may include spacers 141 that protrude toward the cell holder 110 to maintain a predefined gap between the separation member 140 and the cell holder 110. The gap between the separation member 140 and the cell holder 110, which is maintained by the spacers 141, may provide the exhaust gas path for the exhaust gas discharged from the battery cells 10. As will be described below, a space between the blocking region 144 of the separation member 140 and the cell holder 110 may form the exhaust gas path through which the exhaust gas discharged from the upper end portions 10*a* of the battery cells 10 or the lower end portions 10*b* of the battery cells 10 (e.g., the vent portions 13 formed at the upper end portions 10*a* or the lower end portion 10*b* of the battery cells 10) is discharged, and in this case, the spacers 141 of the separation member 140 may maintain an appropriate gap between the separation member 140 and the cell holder 110. In an implementation, the spacers 141 formed at the upper separation member 140*a* may provide the exhaust gas path for the exhaust gas discharged from the upper end portions 10*a* of the battery cells 10 while maintaining the gap between the upper side of the upper holder 110*a* and the blocking region 144 of the upper separation member 140*a*, and the spacers 141 formed at the lower separation member 140*b* may provide the exhaust gas path for the exhaust gas discharged from the lower end portions 10*b* of the battery cells 10 while maintaining the gap between the lower side of the lower holder 110*b* and the blocking region 144 of the lower separation member 140*b*.

Referring to FIGS. 14 and 15, the open regions 145 of the upper and lower separation members 140*a* and 140*b* may be formed at positions corresponding to each other to form the cooling flow paths F that pass through at least a portion of the battery pack. The open regions 145 of the upper and lower separation members 140*a* and 140*b* may form the cooling flow paths F that pass through substantially the entire structure of the battery pack, together with the hollow protrusions 115 of the cell holder 110 interposed between the upper and lower separation members 140*a* and 140*b*, and the open regions 135 of the circuit board 130 interposed between the upper and lower separation members 140*a* and 140*b*. In an implementation, the cooling flow path F may connected from the upper separation member 140*a*, through the circuit board 130, the upper and lower holders 110*a* and 110*b*, between the battery cells 10 inserted into the upper and lower holders 110*a* and 110*b*, and to the lower separation member 140*b*, to pass through substantially the entire structure of the battery pack in the height direction. To this end, the open regions 145 of the upper and lower separation members 140*a* and 140*b* and the open regions 135 of the circuit board 130 may be formed at positions corresponding to each other, and may be formed at positions corresponding to the hollow protrusions 115 such that the hollow protrusions 115 of the cell holder 110 may be inserted into the open regions 145 and the open regions 135.

The separation member 140 may include the blocking region 144 formed at a position corresponding to the vent portions 13 of the battery cell 10. Hereinafter, the blocking region 144 formed at the upper separation member 140*a* will be mainly described. However, the technical aspects of the upper separation member 140*a* described below may be substantially equally applied to the lower separation member 140*b*.

Referring to FIG. 16, the blocking region 144 may be formed to block areas above the vent portions 13 such that the exhaust gas DG discharged from the vent portions 13 (or the terminal holes 112 exposing the vent portions 13) of the battery cells 10 may not pass through the separation member 140. For example, the blocking region 144 may be formed in a closed shape, and unlike the open regions 145, the separation member 140 may not have an opened portion such that the upper and lower sides of the separating member 140 are not fluidly connected to each other, and the upper and lower sides of the separation member 140 are separated from each other, and thus the lower side of the blocking region 144 in which the vent portions 13 (or the terminal holes 112 exposing the vent portions 13) are arranged and the upper side of the blocking area 144 may not be fluidly connected to each other.

As described above, the lower side of the blocking region 144 in which the vent portions 13 (or the terminal holes 112 exposing the vent portions 13) may be arranged and the upper side of the blocking area 144 may not be fluidly connected to each other and may be separated from each other, thus the exhaust gas DG discharged from the vent portions 13 (or the terminal holes 112 exposing the vent portions 13) may not pass through the blocking region 144 and may not be discharged to an upper portion of the blocking region 144, and the exhaust gas DG discharged from the vent portions 13 (or the terminal holes 112 exposing the vent portions 13) may be blocked by the blocking region 144 to flow along the exhaust gas path between the blocking region 144 and the battery cells 10, and may be discharged to the outside of the battery pack along the exhaust gas path.

Referring to FIG. 7, according to an embodiment, the group of the battery cells 10 that constitutes the battery pack may be arranged in which one of the pair of adjacent battery cells 10 is inverted in the height direction, and may include the first group of the battery cells 10 in which the vent portions 13 are formed at the upper end portions 10*a* and the second group of battery cells 10 in which the vent portions 13 are formed in the lower end portions 10*b*. In this case, as illustrated in FIG. 16, the blocking region 144 of the upper separation member 140*a* arranged on the upper side of the upper holder 110*a* may be formed in a closed shape such that one side of the upper separation member 140*a*, in which the upper end portions 10*a* (or the vent portions 13) of the first group of the battery cells 10 are arranged, and the other side of the upper separation member 140*a*, which is opposite to the upper end portions 10*a* (or the vent portions 13) of the first group of the battery cells 10, are not fluidly connected to each other. Similarly, the blocking region 144 of the lower separation member 140*b* arranged under the lower side of the lower holder 110*b* may be formed in a closed shape such that one side of the lower separation member 140*b*, in which the lower end portions 10*b* (or the vent portions 13) of the second group of the battery cells 10 are arranged, and the other side of the lower separation member 140*b*, which is opposite to the lower end portions 10*b* (or the vent portions 13) of the second group of the battery cells 10, are not fluidly connected to each other.

Referring to FIG. 16, the blocking region 144 is not limited to positions corresponding to the vent portions 13 (or the terminal holes 112 exposing the vent portions 13) of the battery cells 10, and may be formed over the entire area of the separation member 140 other than the open regions 145.

For example, the blocking region 144 may extend to the entire area of the separation member 140, other than the open regions 145 for penetration of the cooling flow paths F, between the open regions 145, and may form the exhaust gas path continuously connected from positions corresponding to the vent portions 13 (or the terminal holes 112 exposing the vent portions 13) to the exhaust hole DH. For example, the exhaust gas DG discharged from the vent portions 13 (or the terminal holes 112 exposing the vent portions 13) at different positions may be collected into the exhaust hole DH along the exhaust gas path continuously formed between the blocking region 144 of the separation member 140 and the battery cells 10. According to an embodiment, the exhaust gas path may be formed between the blocking region 144 of the separation member 140 and the battery cells 10 or between the blocking region 144 of the separation member 140 and the cell holder 110 (or the circuit board 130), and may be continuously formed from the vent portion 13 (or the terminal hole 112 exposing the vent portion 13) of each battery cell 10 to the exhaust hole DH formed at one side of the cell holder 110. In an implementation, the exhaust gas path may be formed in a manner in which spaces between the hollow protrusions 115 inserted into the open regions 145 of the separation member 140 are continuously connected to each other, and the exhaust gas DG collected into the exhaust hole DH through the exhaust gas path may be discharged to the outside of the battery pack. According to an embodiment, the exhaust gas path for the exhaust gas discharged from the upper end portions 10a or the lower end portions 10b (or the vent portions 13 formed at the upper end portions 10a or the lower end portions 10b) of the battery cells 10 may be formed between the upper side of the upper holder 110a and the upper separation member 140a and between the lower side of the lower holder 110b and the lower separation member 140b, and may be formed in a manner in which spaces between the hollow protrusions 115 inserted into the open regions 145 of the upper separation member 140a and the lower separation member 140b are continuously connected to each other.

The exhaust gas path, one side of which is closed by the blocking region 144 formed in a closed shape such that the upper and lower sides of the separation member 140 are not connected to each other, may be spatially separated from the cooling flow paths F passing through the upper and lower sides of the separation member 140 through the open regions 145 of the separation member 140. More specifically, the separation member 140 may be formed generally in a plate shape having a closed shape, except for the open regions 145 into which the hollow protrusions 115 are inserted. In this case, the cooling flow paths F may pass through the separation member 140 through the open regions 145 while being surrounded by the hollow protrusions 115, and may be spatially separated from the exhaust gas path formed between the separation member 140 (the blocking region 144) and the battery cells 10, and by the structure in which the cooling flow paths F and the exhaust gas path are spatially separated from each other, a risk of a safety accident that may cause explosion or ignition due to mixing of the cooling medium CM flowing along the cooling flow path F and the high-temperature and high-pressure exhaust gas DG flowing along the exhaust gas path, may be reduced, and in the case of the battery pack mounted on an electric vehicle, the exhaust gas DG may be prevented from being introduced into the interior of the vehicle through the separation member 140, and thus the safety of passengers from toxic gas may be secured.

Referring to FIGS. 1 and 17, an upper duct 150a and a lower duct 150b may be arranged on the upper separation member 140a and under the lower separation member 140b, respectively. An opening OP through which the cooling medium is introduced, may be formed at the upper duct 150a, and the cooling medium introduced into the battery pack through the opening OP may cool the battery cells 10 while passing through the cooling flow paths F formed from the upper separation member 140a to the lower separation member 140b. The cooling flow paths F may be formed between the adjacent battery cells 10, and the battery cells 10 may be cooled by the cooling medium vertically flowing in the height direction of the battery cells 10.

The lower duct 150b may be connected to a fluid device for generating a pressure difference between the inside and the outside of the battery pack, to force a flow of the cooling medium passing through the battery pack. For example, a connection portion M for the fluid device may be formed at one side of the lower duct 150b. In an implementation, the fluid device may be a suction type pump for maintaining an internal pressure of the battery pack to be a negative pressure with respect to the external atmosphere of the battery pack. The fluid device (or the connection portion M for the fluid device) connected to the lower duct 150b may form an outlet of the cooling medium introduced through the opening OP of the upper duct 150a. In an implementation, the opening OP of the upper duct 150a may form the inlet of the cooling medium, and the fluid device (or the connection portion M for the fluid device) connected to the lower duct 150b may form the outlet of the cooling medium. In an implementation, the fluid device may be a blower type pump, and in this case, the fluid device (or the connection portion M for the fluid device) connected to the lower duct 150b may form the inlet of the cooling medium, and the opening OP of the upper duct 150a may form the outlet of the cooling medium.

A negative pressure may be generated in the battery pack by operation of the fluid device, the cooling medium may be introduced into the battery pack through the opening OP of the upper duct 150a by a pressure difference between the inside and the outside of the battery pack, and the cooling medium introduced into the battery pack may cool the battery cells 10 while passing through the cooling flow paths F and may be discharged to the outside of the battery pack through the fluid device connected to the connection portion M of the lower duct 150b.

In an implementation, the opening OP formed in the upper duct 150a and the fluid device (or the connection portion M for the fluid device formed in the lower duct 150b) connected to the lower duct 150b may form the inlet and the outlet of the cooling medium, respectively, and thus, the position of the opening OP formed in the upper duct 150a and the position (or the position of the connection portion M formed in the lower duct 150b) of the fluid device connected to the lower duct 150b may be indicated on both ends of a diagonal line crossing the battery pack in an diagonal direction.

In relation to the positions of the inlet and the outlet of the cooling medium, the diagonal direction of the battery pack may refer to a direction that simultaneously follows the height direction of the battery cell 10 and the direction Z1 of the long side lines of the envelope S1 and S2 (see FIG. 4) surrounding the battery cells 10. That is, supposing that the group of battery cells 10 that constitutes the battery pack is surrounded by the rectangular envelope S1 and S2 (see FIG. 4) consisting of the pair of long side lines S1 and the pair of short side lines S2 that extend to linearly surround the circumference of the group of battery cells 10, the diagonal direction of the battery pack may refer to the direction that simultaneously follows the height direction of the battery cell 10 and the direction Z1 of the long side lines of the envelope S1 and S2. For reference, the direction Z1 of the long side lines and the direction Z2 of the short side lines of the envelope S1 and S2 may correspond to the direction of long side lines and the direction of the short side lines of the cell holder 110, respectively, and may correspond to the direction of long side lines and the direction of the short side lines of the battery pack, respectively.

In an implementation, the flow of the cooling medium passing through the inside of the battery pack may be induced by using the opening OP of the upper duct 150*a* and the fluid device of the lower duct 150*b* (or the connection portion M formed in the lower duct 150*b*) formed at both ends of the diagonal line crossing the battery pack in the diagonal direction. In an implementation, the position of the opening OP formed in the upper duct 150*a* and the position of the fluid device (or the connection portion M formed in the lower duct 150*b*) connected to the lower duct 150*b* may be formed at positions spaced apart from each other along the direction Z1 of the long side lines of the envelope S1 and S2 or the direction Z1 of the long side lines of the battery pack, and for example, in the case where the position of the opening OP formed in the upper duct 150*a*, e.g., the position of at least a portion of the opening OP formed in the upper duct 150*a* is formed at one edge position along the direction of the long side lines of the battery pack, the position of the fluid device connected to the lower duct 150*b* (or the position of the connection portion M formed in the lower duct 150*b*) may be formed at the other edge position along the direction of the long side lines of the battery pack. As described above, the opening OP formed in the upper duct 150*a* and the fluid device (or the connection portion M formed in the lower duct 150*b*) connected to the lower duct 150*b* may be formed at the one edge position and the other edge position along the direction of the long side lines of the battery pack, and accordingly, the flow of the cooling medium that connects the opening OP of the upper duct 150*a* to the fluid device (or the connection portion M formed in the lower duct 150*b*) of the lower duct 150*b* may be formed to cross the inside of the entire battery pack.

As described above, the connection portion M for the fluid device may be formed at the one edge position of the battery pack in the direction of the long side lines of the battery pack, and a fixing portion FX for the fluid device may be formed together with the connection portion M for the fluid device at the one edge portion of the battery pack in which the connection portion M for the fluid device is formed. That is, an inlet or an air blowing hole of the fluid device, according to a type of the fluid device, may be connected to the connection portion M for the fluid device, and the position of the fluid device may be fixed by the fixing portion FX for the fluid device. The exhaust pipe DP may be formed at the one edge portion of the battery pack in which the connection portion M for the fluid device is formed. Since the exhaust pipe DP requires an installation space to protrude toward the outside of the battery pack, the exhaust pipe DP may be formed at one edge portion of the battery pack to which the fluid device is connected, and the connection portion M for the fluid device, the fixing portion FX for the fluid device, and the exhaust pipe DP may be formed at one edge portion of the battery pack, and accordingly, the other edge portion of the battery pack may provide a position alignment surface of the battery pack, for example, a reference surface for position alignment with an electric vehicle on which the battery pack is mounted.

One or more embodiments may provide a battery pack which is advantageous for slimming, in that the length of a connection member that forms a voltage measurement line between a circuit board and a battery cell may be reduced by decreasing the distance between the battery cells and the circuit board, the connection members may be firmly bonded, and the amount of potting resin injected through filling holes of the circuit board may be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
    a plurality of battery cells;
    a plurality of bus bars, each bus bar:
        electrically connecting two different battery cells among the plurality of battery cells, and
        including coupling pieces at opposite ends thereof that are coupled to the two different battery cells, and a protruding connecting piece at a center of the bus bar that connects the coupling pieces at opposite ends;
    a circuit board on the plurality of bus bars and electrically connected to at least a portion of the plurality of battery cells, the circuit board having escape holes that expose the protruding connecting piece of each bus bar; and
    a cell holder, the cell holder having:
        a first side in which the battery cells are accommodated, and
        a second side including hollow protrusions connected to cooling flow paths between adjacent battery cells of the plurality of battery cells,
    wherein the circuit board further includes a bus opening region continuous with the escape holes in a single hole shape, the bus opening region exposing the hollow protrusions of the cell holder and the protruding connecting pieces of the plurality of bus bars.

2. The battery pack as claimed in claim 1, wherein each escape hole completely exposes a corresponding protruding connecting piece.

3. The battery pack as claimed in claim 1, wherein the protruding connecting pieces do not overlap a solid portion of the circuit board that surrounds the escape holes.

4. The battery pack as claimed in claim 1, wherein each escape hole completely accommodates a corresponding protruding connecting piece.

5. The battery pack as claimed in claim 1, wherein:
    the circuit board has a lower side facing the plurality of battery cells and an upper side that is opposite to the plurality of battery cells, along a height direction of the plurality of battery cells, and
    a plane of each protruding connecting piece is between a plane of the upper side of the circuit board and a plane of the lower side of the circuit board.

6. The battery pack as claimed in claim 1, wherein the bus bars and the circuit board are on the second side of the cell holder.

7. The battery pack as claimed in claim 1, wherein each bus bar extends between a corresponding pair of the hollow protrusions that face each other.

8. The battery pack as claimed in claim 7, wherein the pair of the hollow protrusions face each other in a direction intersecting a lengthwise extending direction of the bus bar therebetween.

9. The battery pack as claimed in claim 7, wherein the protruding connecting piece of each bus bar is between the corresponding pair of the hollow protrusions.

10. The battery pack as claimed in claim 9, wherein the cell holder further includes pairs of locking steps, into which the protruding connecting piece of each bus bar is inserted, at each of the pairs of hollow protrusions, the pairs of locking steps each protruding from wall bodies of the corresponding pair of hollow protrusions toward the protruding connecting piece therebetween.

11. The battery pack as claimed in claim 10 wherein the cell holder further includes mold holes from which the pairs of hollow protrusions protrude, at positions corresponding to the pairs of locking steps, to pass through the cell holder.

12. The battery pack as claimed in claim 7, wherein:
each bus bar further includes position alignment holes for position alignment with the cell holder, the position alignment holes being in the protruding connecting piece of each bus bar, and
the cell holder further includes position alignment pins that are insertable into the position alignment holes of corresponding bus bars, the position alignment pins being between the pairs of hollow protrusions.

13. The battery pack as claimed in claim 12, wherein pairs of the position alignment pins are arranged along a lengthwise direction of a corresponding one of the plurality of bus bars.

14. The battery pack as claimed in claim 1, wherein the bus opening region exposes pairs of the hollow protrusions together with the protruding connecting pieces therebetween.

15. The battery pack as claimed in claim 1, further comprising connection members on the circuit board, passing through the circuit board, and connected to the battery cells,
wherein:
the circuit board further includes connection opening regions,
the connection members pass through the connection opening regions of the circuit board, and
the connection opening regions expose pairs of the hollow protrusions facing each other with corresponding connection members therebetween.

16. The battery pack as claimed in claim 15, wherein respective ends of the connection members are ultrasonically welded to the circuit board and the battery cell.

17. The battery pack as claimed in claim 15, wherein the bus opening region and the connection opening region are continuous with each other to form a second opening region in a single hole shape.

18. The battery pack as claimed in claim 17, wherein the second opening region exposes:
a first hollow protrusion of the hollow protrusions that is between a first bus bar of the plurality of bus bars and a first connection member of the connection members,
a second hollow protrusion of the hollow protrusions that faces the first hollow protrusion with the first bus bar therebetween, and
a third hollow protrusion of the hollow protrusions that faces the first hollow protrusion with the first connection member of the connection members therebetween.

* * * * *